United States Patent
Douceur et al.

(10) Patent No.: US 6,247,061 B1
(45) Date of Patent: Jun. 12, 2001

(54) METHOD AND COMPUTER PROGRAM PRODUCT FOR SCHEDULING NETWORK COMMUNICATION PACKETS ORIGINATING FROM DIFFERENT FLOWS HAVING UNIQUE SERVICE REQUIREMENTS

(75) Inventors: John R. Douceur, Bellevue; Yoram Bernet, Seattle; Ofer Bar, Newcastle, all of WA (US); Carol Ann Bell, Beaverton, OR (US); Tsung-Yuan Charles Tai; Rajendra S. Yavatkar, both of Portland, OR (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/094,045

(22) Filed: Jun. 9, 1998

(51) Int. Cl.[7] .............................. G06F 15/16; G06F 15/76

(52) U.S. Cl. ......................... 709/240; 709/226; 709/235; 340/825.5; 370/230

(58) Field of Search .................................. 709/226, 240, 709/232, 234, 235; 340/825.5; 370/229, 230, 231, 232, 233, 234, 235

(56) References Cited

U.S. PATENT DOCUMENTS 5,463,624 * 10/1995 Hogg et al. .
5,517,622    5/1996 Ivanoff et al. .
5,521,923 *  5/1996 Willmann et al. .

(List continued on next page.)

OTHER PUBLICATIONS

Floyd et al., *Link–Sharing and Resource Management Models for Packet Networks*, IEE/ACM Transactions on Networking, vol.3, No. 4 Aug. 1995 pp1–23.

Floyd, Sally, *Notes on CBQ and Guaranteed Service*, Lawrence Berkeley Labortory, Jul. 12, 1995 pp.1–3.

Wakeman, I., et al. *Implementing Real Packet Forwarding Policies Using Streams*, Lawrence Berkeley Laboratory, Nov. 7, 1994, pp. 1–13.

(List continued on next page.)

*Primary Examiner*—Robert B. Harrell
*Assistant Examiner*—Stephan Willett
(74) *Attorney, Agent, or Firm*—Workman, Nydegger & Seeley

(57) ABSTRACT

A method and computer program product for scheduling network communication packets in a multimedia environment where different packet streams have reservations of network bandwidth to form packet flows. The present invention divides the packet scheduling function into distinct components that may be implemented as separate drivers in a layered driver environment as exists, for example, in the Microsoft Windows NT operating system. One component is called a conformer and will generate and assign to each packet in the packet flow at least one conformance time that signifies the earliest a packet may be sent and still conform to the network resource requirements associated with the flow. Many different conformance algorithms can be supported so that the best algorithm is used for a particular packet flow and the service requirements that it represents. Should it be necessary to actually hold a packet until the conformance time is met, a shaper component is used to delay the packets. Finally, a sequencer component will send packets out as fast as possible over the network interface card. Each flow of packets processed by the sequencer component has at least two priorities, one for when the packets are conforming and one for when the packets are non-conforming. The sequencer component maintains priority lists of packet flow queues and will service the highest priority queue list followed by each successive priority list until no packets remain for transmission or the network interface card is unable to handle more packets. Each priority list will have a queue discipline associated therewith that will determine in what order the packets are taken off of the respective flow queues.

21 Claims, 26 Drawing Sheets

U.S. PATENT DOCUMENTS

| | | | |
|---|---|---|---|
| 5,553,061 | * | 9/1996 | Waggener, Jr. et al. . |
| 5,555,264 | * | 9/1996 | Sallberg et al. . |
| 5,724,513 | * | 3/1998 | Ben-Nun et al. . |
| 5,790,522 | * | 8/1998 | Fichou et al. . |
| 5,796,956 | * | 8/1998 | Jones ................................... 709/233 |
| 5,819,043 | * | 10/1998 | Baugher et al. . |
| 5,822,317 | | 10/1999 | Shibata . |
| 5,831,971 | * | 11/1998 | Bonomi et al. ...................... 370/229 |
| 5,884,037 | * | 3/1999 | Aras et al. . |
| 5,889,956 | * | 3/1999 | Hauser et al. ...................... 709/226 |
| 5,903,735 | * | 5/1999 | Kidder et al. . |
| 5,917,822 | * | 6/1999 | Lyles et al. . |
| 5,935,218 | * | 8/1999 | Beyda . |
| 5,974,465 | * | 10/1999 | Wong ................................. 709/234 |
| 5,983,278 | * | 11/1999 | Chong et al. ....................... 709/235 |
| 5,987,522 | * | 11/1999 | Rijhsinghani ....................... 709/240 |
| 5,996,013 | * | 11/1999 | Delp et al. .......................... 709/226 |
| 5,996,020 | * | 11/1999 | Reed . |
| 6,003,086 | * | 12/1999 | Mitsutake et al. . |
| 6,005,866 | * | 12/1999 | Lincoln . |
| 6,011,775 | | 1/2000 | Bonomi et al. . |

OTHER PUBLICATIONS

Demers, A., et al., *Analysis and Stimulation of a Fair Queueing Algorithm*, Xerox PARC, 1989, pp.1–12.

*Interface Queue Management*, Cisco Brochures, May 20, 1996, pp. 1–11

Shreedhar and Varghese, *Efficient Fair Queueing Using Deficit Round Robin*, IEEE/ACM, Transactions on Networking, Jun. 1996.

* cited by examiner

METHOD AND COMPUTER PROGRAM PRODUCT FOR SCHEDULING NETWORK COMMUNICATION PACKETS ORIGINATING FROM DIFFERENT FLOWS HAVING UNIQUE SERVICE REQUIREMENTS

BACKGROUND OF THE INVENTION

1. The Field of the Invention

The field of the present invention is that of scheduling network communication packets for delivery onto a communications network. More specifically, a stream of packets requiring certain resource requirements, such as sound or video data in a multimedia application, are scheduled such that the service requirements for proper processing of packetized data may be met on the receiving end of the network connection.

2. Present State of the Art

Over time, the usefulness and benefits of stand alone computing devices, such as the ubiquitous personal computer, have been leveraged by allowing many of such computing devices to communicate one with another over a communications network. Network communication between computers allows many different kinds of applications to exist that are otherwise not possible with a stand alone computing device.

For communicating over a network, information that is to be transported from one computer to another is divided into a number of network communication packets. These network packets (also known simply as "packets") will eventually be transported across physical communications network. In the PC environment, transmission is handled by a network interface card residing in the personal computer. Throughout this application, the PC environment will be assumed though the discussion and application of the concepts applied to many different network computing environments as will be appreciated by those skilled in the art.

Initially, simple file transfers and messaging, such as e-mail, between networked computers constituted one major form of useful applications. Delays due to network traffic had little impact on the quality of service for such applications since a relatively long delay could be sustained without irritation on the part of the end user.

Currently, multimedia applications will have streaming data that is communicated from one computer to another such as successive sound or video frames. Such streaming data must be processed on a rate basis at the destination node and that same rate should be maintained for packet delivery over the network connection. Streaming data typically refers to a continuous set of successive packets that, in order to be processed correctly at the receiving computer, must have certain guaranteed transmission characteristics.

In other words, the packets should be sent at a certain rate with a certain limitation on the amount of variability between when successive packets are sent. Otherwise, packets will not be received and processed appropriately by the receiving computer and perceptible errors occur from the perspective of the end user. For example, a video frame may be lost or temporarily frozen if there is some sort of interruption in the stream of packets being processed.

In order to assure a certain quality of service, reservation of network bandwidth or other relevant resource is required. A number of different protocols have been developed, such as RSVP, ATM, etc., for making bandwidth reservations on all nodes that would be in charge of carrying network communication packets between the source and destination nodes. In this manner, once the bandwidth reservations are made, the packets may be sent as part of a data stream from the source node to the destination node with the assurance that a certain quality of service will result due to the bandwidth reservation.

When a packet data stream is associated with some form of resource guarantee or allocation, such as a bandwidth reservation, it is said to be a packet flow. In order to meet the service requirements for a data stream one or more packet flows can be established between the networked nodes. Packets are scheduled for delivery onto the communications network from the origination node based on the data streams quality of service requirements. Therefore, many different packet scheduling algorithms have been developed depending on different scenarios and requirements. Furthermore, this is an area of ongoing research such that other algorithms that are not yet known may be used in the future for ensuring quality of service requirements.

A live audio-video connection that is sent over the Internet or other packet switching network is an example of a data stream having quality of service requirements. Such an audiovisual data stream may occur as part of a videotelephone and would require that the information be delivered quickly and without too much delay so that quality pictures and sound could be perceived by the end user. When quality of service requirements are not met in such an application, a jerky or frozen image may result or the picture and sound may appear too unnatural for interaction due to delay.

The quality of service for a data stream that is transported over a communications network is transformed into a flow of packets, where the packets are scheduled for delivery onto the network in such a manner that the quality of service characteristics can be met. What is needed is a flexible packet scheduling mechanism that allows different algorithms to be supported for each packet flow. In this manner, the particular requirements or situation for a given packet flow can be adapted to the best suited algorithm. Furthermore, such a packet scheduling mechanism should also be extensible so that it may incorporate new scheduling algorithms as may be developed in the future. In this manner, many possible algorithms may be supported so that many potential algorithms may coexist on the same machine and be used for meeting quality of service requirements for different packet flows.

SUMMARY AND OBJECTS OF THE INVENTION

It is an object of the present invention to provide a flexible packet scheduling mechanism that supports multiple scheduling algorithms.

It is another object of the present invention to deliver packets from a packet flow over communications in such a manner that service quality requirements for a data stream are met.

It is yet another object of the present invention to assign a conformance time to a packet representing a time for an action to take place in order to have that packet conform to a service requirement and that may be used by one or more other components processing the packet at a later point in time.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method and computer program product for scheduling network communication packets originating from different streams having unique service requirements is provided. The present invention overcomes the limitations in the prior art by dividing the packet scheduling function into distinct components that may be implemented as separate drivers in a layered driver environment as exists, for example, in the Microsoft Windows NT operating system or implemented in other ways as part of the protocol stack.

One component is called a conformer and will generate and assign to each packet in the packet flow at least one conformance time that signifies the earliest time at which a packet may be sent while still conforming to the network resource requirements associated with the flow. Many different conformance algorithms can be supported so that the best algorithm is used for a particular packet flow and the service requirements that it represents. The conformer may also be used to discard packets whose conformance times are greater than the current time such that they are considered dropped.

A general or default conformance algorithm is provided that handles many current constraints in an acceptable manner. The default conformance algorithm implements a token bucket algorithm for setting the conformance time with respect to the sustained data rate and a leaky bucket algorithm that recalculates the conformance time so that the peak data rate may be met. A number of settings or traffic parameters may be adjusted in order to achieve a variety of desired results with the default conformance algorithm.

After the generation of the conformance time based on the token bucket algorithm, the discard test is made. Finally, the conformance time is recalculated based on the leaky bucket algorithm and sent down to a shaper component. It is necessary to base the discard test upon the sustained-rate conformance time, rather than the peak-rate conformance time, due to the batch nature of packet processing in the protocol stack in the PC environment. Otherwise, an undue number of packets may be discarded thereby resulting in unacceptable performance characteristics.

Should it be necessary to actually hold a packet until the conformance time is met, a shaper component is used to delay the packets. This will shape the packet traffic so that the packets will be delivered in general around the actual conformance time. Traffic shaping is selectable on a packet flow basis and if it is not performed, the packet is simply passed through the shaper component onto the next processing component.

Another component is the sequencer component that will send packets out as fast as possible over the network interface card. Each flow of packets processed by the sequencer component has two priorities, one for when the packets are "conforming" meaning that the current time is greater than the conformance time and one for when the packets are "non-conforming" meaning that the conformance time has not yet been met. The sequencer component maintains priority lists of packet flow queues and will service the highest priority queue list followed by each successive priority list until no packets remain for transmission or the network interface card is unable to handle more packets. Each priority list will have a queue discipline associated therewith that will determine in what order the packets are taken off of the respective flow queues. Some common examples of potential queue disciplines include round robin, deficit round robin, and sequential based on conformance time. Because each flow queue may have different priorities, they may migrate among different priority lists based on the current time and the conformance time for the packet at the head of the queue.

The present invention is easily extensible for other pertinent types of scheduling processing due to its modular implementation. If other functionality is necessary, another type of component may be easily added that will not disrupt the operation of the existing components.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 is a flow chart depicting the processing steps performed when a packet for a particular flow is received by the conformer component. Specifically.

FIG. 7A shows the initial condition with the timer set to expire at time 103, while FIG. 7B shows the condition of the data structures after the timer has expired and the processing steps of the flowchart shown in FIG. 6 have been executed. FIG. 7C shows the condition of the data structures of FIG. 7B after the timer has expired at time 114 and the processing steps of the flowchart shown in FIG. 6 have again been taken. Finally, FIG. 7D shows the data structures of FIG. 7C after the introduction of a new packet for flow 2 having a conformance time of 125 after following the processing steps of the flowchart shown in FIG. 5.

FIG. 10A shows the steps for a RetrievePacket method according to a round robin queue discipline, FIG. 10B for a deficit round robin queue discipline, and FIG. 10C for a conformance time sequential queue discipline.

FIG. 12A is the initial state of the data structures, while FIG. 12B shows the data structures of FIG. 12A after the receipt of a new nonconforming packet. FIG. 12C shows the data structures of FIG. 12B after receiving another nonconforming packet and the passage of time that causes flow 2 to be switched from priority list 2 to priority list 0 since the head packet of the flow is now conforming.

FIGS. 12D through 12H show the processing of the various priority lists in response to a series of 20 send complete indications received from the network interface causing a total of 20 packets to be sent over the communications interface. FIG. 12D are the data structures of FIG. 12C wherein priority list 0 is cleared by sending the designated packets in sequenced order according to a round robin queue discipline in response to a number of send complete indications from the network interface. FIG. 12E shows the data structures as shown in FIG. 12D after the priority 0 list has been fully processed and shows the clearing of the priority 1 list according to a round robin queue discipline. FIG. 12F is the data structures as shown in FIG. 12E at a point after the priority 1 list has been completely cleared and shows the clearing of the priority 2 list, again according to a round robin queue discipline. FIG. 12G shows the data structures as shown in FIG. 12F at a point after the priority 2 list has been cleared and further shows the clearing of the priority 3 list wherein the packets are removed according to a conformance time sequential queue discipline and will finish when no more send complete indications are received by the sequencer component. FIG. 12H shows the data structures as shown in FIG. 12G in its final state after clearing the priority 3 list as much as possible and after the processing of the series of send complete indications initially received in FIG. 12D.

DETAILED DESCRIPTION OF THE PREFERRED EMBODIMENTS

As used herein, the term "driver" refers to software driver programs running in a privileged system environment and that is interact with an I/O subsystem as part of an operating system architecture. Such drivers are distinguishable from application programs and other software.

As used herein, the term "service requirements" refers to the quality of data stream processing such that high quality is perceived by the end user. Service requirements may require a resource reservation, such as a share of the network band width, as well as absolute or statistical guarantees on relevant metrics pertaining to packet delivery and processing, such as maximum latency, maximum variability of latency, minimum reliability of delivery, etc.

As used herein, the term "traffic parameters" refers to actual parameters used in a conformance algorithm in order to meet the service requirements. The traffic parameters in conjunction with the particular scheduling algorithm can be viewed as representative of the service requirements. In other words, with the correctly set traffic parameters, the conformance algorithm will generate conformance times such that the packets are delivered over the network in such a way as to ensure that the service requirements are met.

As used herein, the term "packet flow" or "flow" refers to a sequential stream of packets and an accompanying reservation of resources, such as network bandwidth.

As used herein, the term "conformance algorithm" refers to an algorithm that generates a conformance time of delivery for a particular packet so that if delivered at that time along with all other packets of a particular flow at their designated conformance of times, the flow of packets will be said to conform ideally with the service requirements imposed thereon. The current time is the time on the actual personal computer upon which decisions are made with when measured relative to the conformance time.

Figure 1:
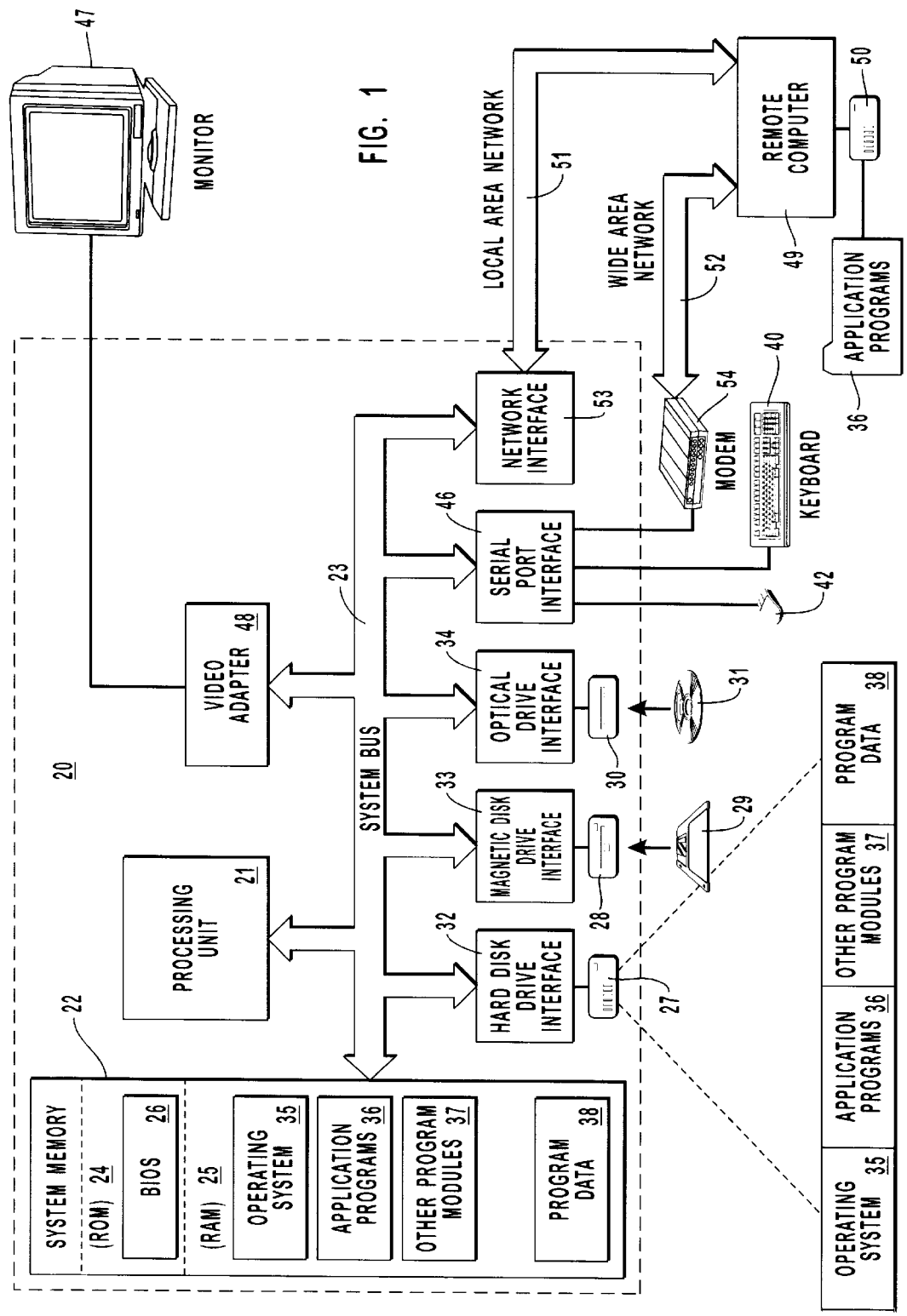
FIG. 1 is a block diagram of an exemplary system for implementing the present invention that includes a general purpose computing device in the form of a conventional personal computer.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. the system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices enterprise-wide computer networks, intranets and the Internet.

When used in a LAN networking environment, the personal computer 20 is connected to the local network 51 through a network or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
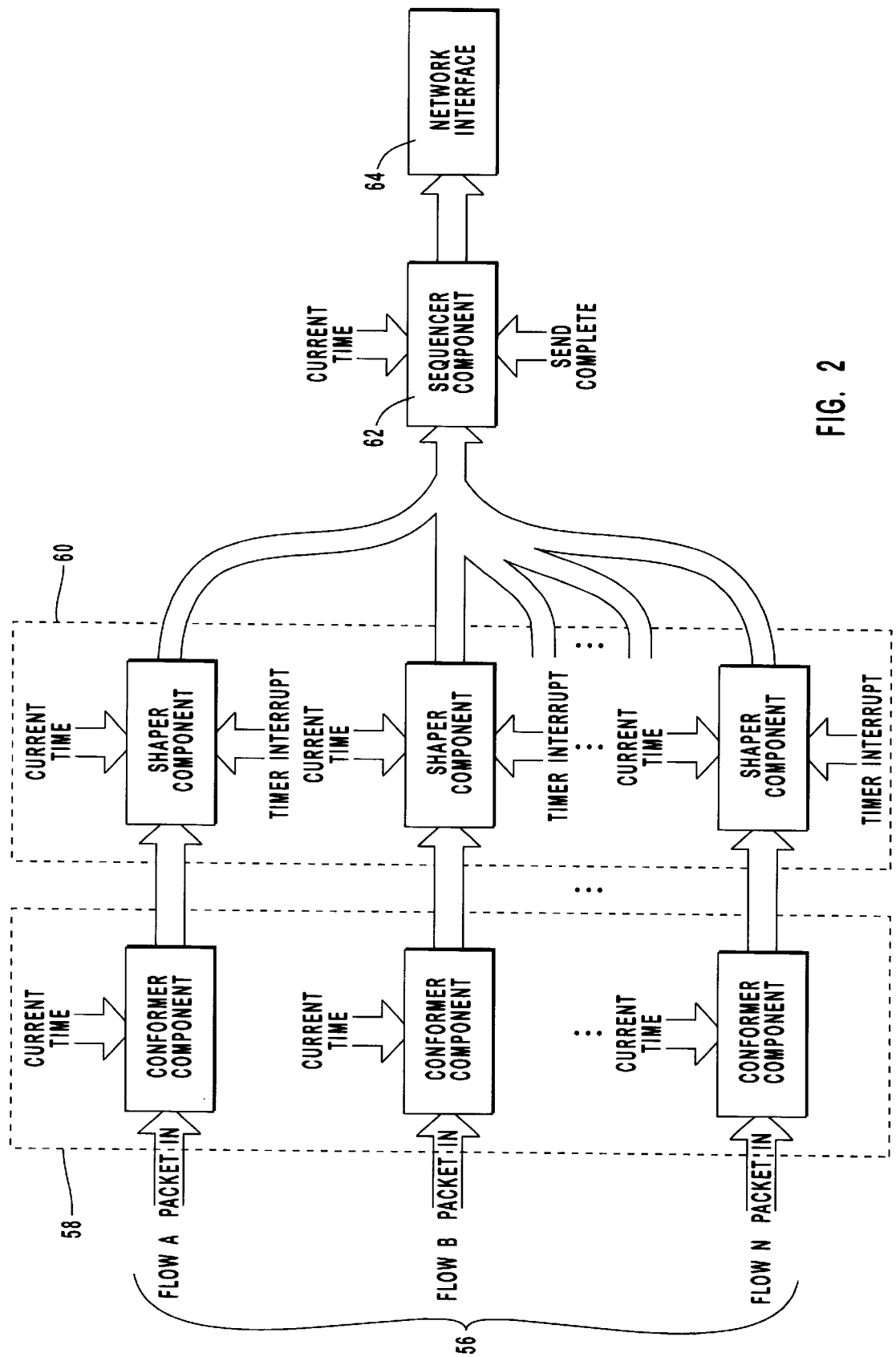
FIG. 2 is a block diagram logically depicting the present invention having a conformer component and shaper component for each flow and a common sequencer component to order the packets for delivery over the network interface.

Referring now to FIG. 2, the logical diagram showing the different and separate components used to implement the current invention is shown. A group of different packet flows 56 enter into a group of conformer components 58 that have been circled by the dashed line. The purpose of the conformer component is to assure that a conformance time is generated for each packet coming in that is made according to a particular conformance algorithm or traffic parameters unique to each individual flow.

Once a conformance time has been set, each packet from the group of flows 56 will pass from the group of conformer components 58 to a group of shaper components 60. The shaper component for each flow will shape the packets from that flow to actually meet the conformance time. In other words, packets may be discarded or delayed for further processing so that the overall traffic flow fits the service requirements more exactly for the particular flow.

All packets from the group of flows 56, after passing through the group of shaper components 60, will flow into a common sequencer component 62 that will order the packets from all flows for delivery over the network interface 64. As shown in FIG. 2, each flow can be logically viewed as having its own conformer component and shaper component while the sequencer component can be viewed as shared across all flows.

Figure 3:
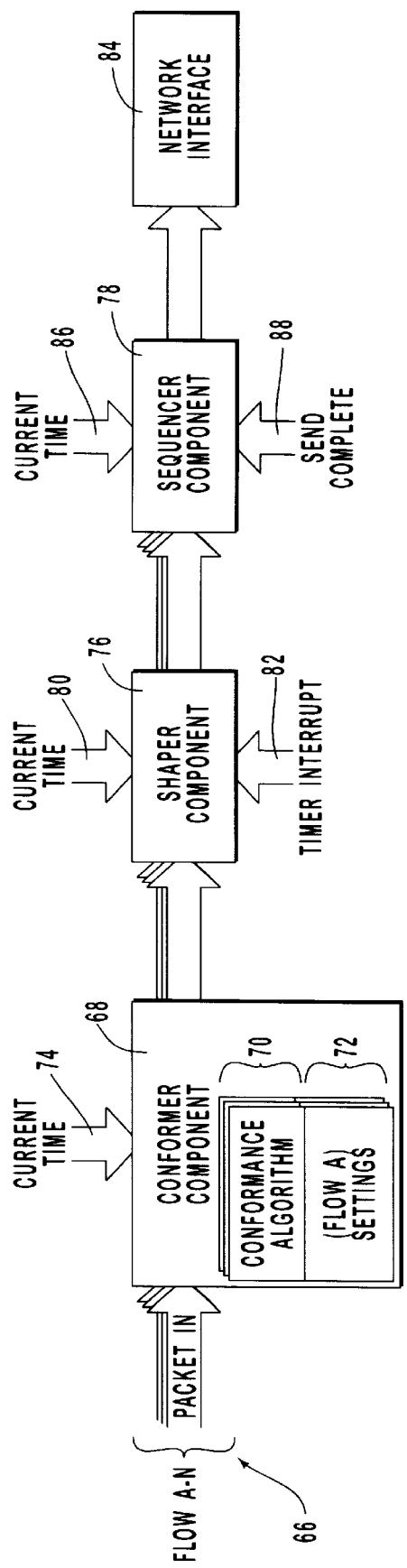
FIG. 3 is a consolidated version of FIG. 2 showing a block diagram of the three main components of the present invention, namely a conformer component, a shaper component, and a sequencer component that together form the packet scheduling mechanism according to the present invention.

FIG. 3 shows the logical diagram of FIG. 2 in a more consolidated fashion representing more closely an actual implementation with a group of packet flows 66 delivering packets into a conformer component 68. The conformer component 68 has a particular conformance algorithm 70 with accompanying packet flow traffic parameter settings 72 for each packet flow handled. Note that besides the particular conformance algorithm 70 and packet flow traffic parameter settings 72 for the particular flow, the current time, as represented by arrow 74, is used as an input in making the conformance time calculations.

After passing through the conformer component 68, each packet for each particular flow of the group of packet flows 66 will arrive at the shaper component 76. The shaper component 76 will either pass the packet directly to the sequencer component 78, or delay the packet for delivery at a later time based on the shaper component settings for the particular packet flow. The current time is represented by arrow 80 and is used by the shaper component 76 to make those determinations for each individual packet based on the shaper component settings and the conformance time of the incoming packet. Furthermore, when a packet is to be delayed for delivery, a timer interrupt as represented by arrow 82 is set by the shaper component that will expire when it is appropriate to pass a particular packet on to the sequencer component 78.

The sequencer component 78 will deliver the packets from all packet flows to the network interface 84 for delivery over the communications network. Within the sequencer component 78, packets will be queued up according to whether the packet is "conforming" meaning that the current time as represented by arrow 86 is greater than the conformance time or "nonconforming" meaning that the current time is less than the conformance time associated with the packet. Priorities to the queues will be assigned such that all higher priority queues are serviced before servicing the lower priority queues with packets being delivered to the network interface 84 as quickly as the network interface may process them. At times, the sequencer component 78 will be unable to send any more packets to the network interface 84 until a send complete as represented by arrow 88 is received by the sequencer component indicating that the network interface 84 is able to then receive more packets for processing.

Each of the different components described herein may be implemented in a number of ways that will be appreciated by those skilled in the art. One convenient technique for implementation of the discrete components is through layered software drivers. Such drivers are often integrated with the I/O system such that a means for receiving and sending packets between the components is handled by the I/O system through API calls in the software drivers.

An important factor in allowing the compartmentalized approach as represented by the discrete components is the use of a conformance time associated with each packet. The conformance time represents the traffic parameters of a resource reservation as applied through a conformance algorithm and can be used with other information available to downstream components as part of relevant processing decisions. For example, all components have access to the current time so that whether a packet is conforming or not may be determined at any particular point in time. A packet having a conformance time associated therewith represents an efficient way of communicating much important information between the components in an elegant manner that allows the clean separation of purpose between components.

Figure 4A:
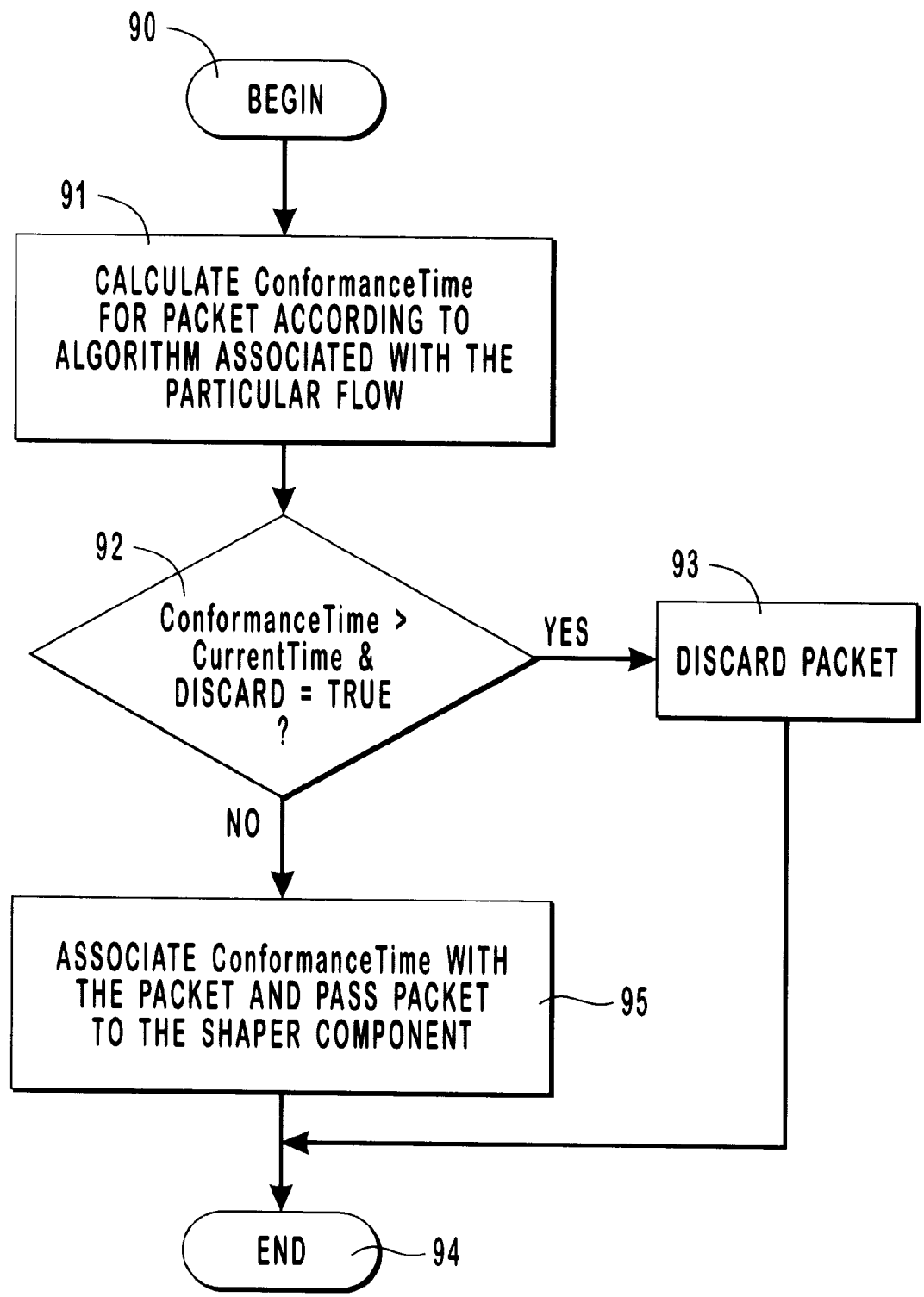
FIG. 4A is a general flow chart showing the generation and assignment of a conformance time.

Referring now to FIG. 4A, a general flow chart showing the operation of the conformer component 68 of FIG. 3 is shown. After beginning at step 90, the conformance time for a received packet is calculated at step 91 according to the conformance algorithm 70 and the particular flow traffic parameters setting 72 associated with the particular flow. Any one of many different algorithms known in the art may be used with each particular flow and even when the same algorithm is used with two flows, each of the flows may have separate settings which will influence the operation of the algorithm differently for the respective packet flows.

At step 92 a determination is made whether the packet should be discarded. This is done by comparing the recently assigned conformance time with the current time and if the conformance time is greater than the current time and if the discard setting is true, then the packet will be discarded at step 93 before processing ends at step 94. Otherwise, the packet is not to be discarded and will be sent to the shaper component at step 95. Note that the conformance time for the particular packet is also associated with the packet at step 95 so that it may be accessed by the shaper component 76, the sequencer component 78, or any other component that may be processing the packet.

Figure 4B:
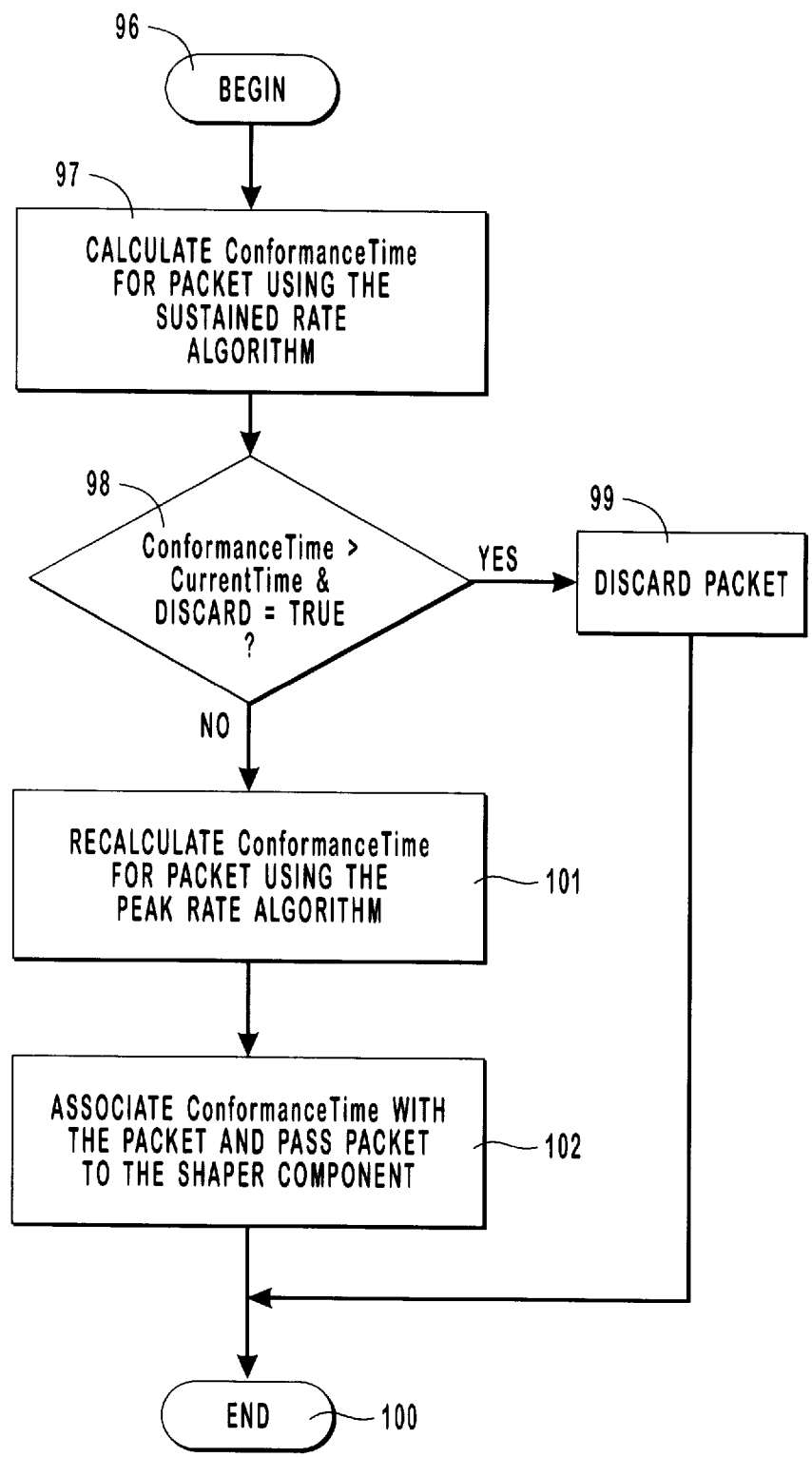
FIG. 4B is a general flowchart showing the calculation of a conformance time based on a sustained data transfer rate algorithm before making a discard determination followed by a recalculation of the conformance time based on a peak data transfer rate. Finally.

Referring now to FIG. 4B, a general flowchart showing the interaction of a conformance algorithm having a sustained data transfer rate limitation ("sustained rate") and a peak data transfer rate limitation ("peak rate") with a discard operation is shown. Only packets that fail to conform to the sustained data transfer rate are discarded. Those packets that conform to the sustained data transfer rate but not to the peak data transfer rate are assigned a recalculated conformance time according to the peak data transfer rate. This recalculated conformance time may be used by subsequent components (e.g., the shaper component) to ensure that the peak data transfer rate is not exceeded.

The operation of a conformer component using a sustained rate/peak rate algorithm as explained above is now shown in more detail. After beginning at step 96, the conformance time is first calculated using the sustained rate algorithm at step 97. This allows the conformance time to be calculated in order to meet the sustained data transfer rate traffic parameter for a particular flow.

At step 98, a determination is made whether to discard the packet by comparing the conformance time with the current time. If discarding is selectively operational for the flow and the conformance time is greater than the current time, meaning that the conformance time has not yet passed for this packet, then the packet is discarded at step 99 before processing ends at step 100.

If no discard is to take place as determined at step 98, processing passes onto step 101 where the conformance time is recalculated according to the peak rate algorithm that is used to assure that the conformance time is calculated to meet the peak data transfer rate traffic parameter for a particular flow. This recalculated conformance time will be associated with the packet at step 102 after which the packet is passed on to the shaper component for further processing.

It is necessary to base the discard test upon the sustained-rate conformance time, rather than the peak-rate conformance time, because packets are in some instances received in batches through the protocol stack. Only the first packet in a batch can conform to any finite peak rate, since all subsequent packets will have arrived with an inter-packet spacing of zero, rather than the spacing required by the peak rate, thus causing packets to be dropped inappropriately.

For purposes of the conformer component, the sustained rate/peak rate conformance algorithm as explained in connection with the flowchart shown in FIG. 4B provides a wide variety of different behavior depending upon the settings used. The traffic parameters representing the service requirements of a particular packet flow will be the flow settings for the sustained rate/peak rate conformance algorithm or the settings for whichever conformance algorithm is chosen and implemented for a particular situation.

One conformance algorithm that can be used is a token bucket algorithm for managing the sustained packet rate and a leaky bucket algorithm for managing the peak rate. Both of these algorithms are well known prior art techniques and are used together to form a default conformance algorithm that can be used in the conformer component to operate as shown by the processing steps of the flowchart shown in FIG. 4C. Their use in the prior art, however, has been primarily used at the input of some form of packet switch to monitor characteristics of incoming packets so that they may be policed. In the present invention, they are used for generating conformance times to be associated with packets so that the packets will conform to the relevant traffic parameters associated with a reservation.

Figure 4C:
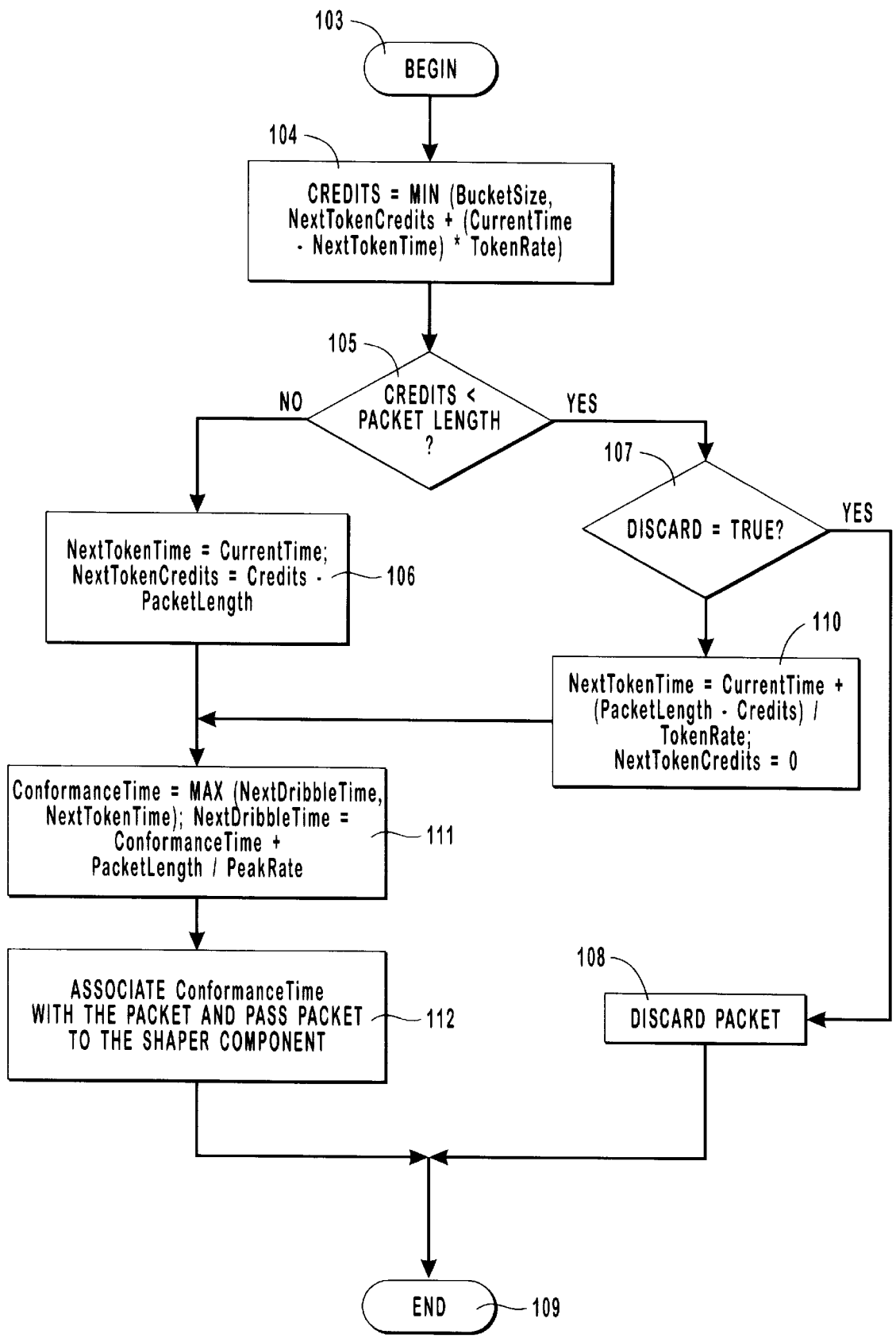
FIG. 4C is a specific flowchart showing the specific steps taken by a default conformance algorithm having various variables that may be set in order to create a variety of different algorithmic effects depending on the actual setting values.

The default performance algorithm implements the token bucket algorithm for a sustained rate conformance time calculation and the leaky bucket algorithm for a peak rate conformance time calculation. FIG. 4C is essentially the more detailed implementation of FIG. 4B that uses the token bucket algorithm as a sustained rate algorithm and the leaky bucket algorithm as a peak rate algorithm.

In order to manage the different aspects of the algorithm, certain variables are used. After beginning at step 103, a calculation for the temporary CREDITS variable is made at step 104. This is done in order to determine whether the sustained rate will be overrun by delivering a packet of the given PacketLength as determined in step 105. The CREDITS calculations is determined by the following equation:

$$CREDITS=MIN(BucketSize, NextTokenCredits+(CurrentTime-NextTokenTime)*TokenRate)$$

Where BucketSize is a variable indicating the maximum size of the token bucket and controls the "burstiness" of data through the conformance algorithm, NextTokenCredits is a variable containing the credits (in terms an amount of data) previously accumulated in the bucket before receiving this packet, CurrentTime is a variable representing the current system time as of the receipt of the packet by the conformer component, NextTokenTime is a variable representing the time the NextTokenCredits is valid, and TokenRate is a variable representing the sustained traffic rate.

The calculation made for the CREDITS variable in step 104 essentially assures that there exists a certain amount of "credits" or amount of data that can be transferred at this point in time without exceeding the sustained rate for the default conformance algorithm. Note that this sustained rate can be manipulated by adjusting the value of the TokenRate variable while the amount of burst data or "burstiness" can be handled by manipulating the BucketSize variable.

At step 105, the length of the packet ("PacketLength") received by the conformer component is compared to the CREDITS calculation. If the amount of CREDITS meets or exceeds the PacketLength, then the sustained rate can be met and the adjustments are made to the variables at step 106 where the NextTokenTime is assigned the CurrentTime and the NextTokenCredits is assigned the CREDITS calculation minus the PacketLength. In other words, the packet meets the sustained rate as determined by the token bucket algorithm without any adjustments, and the length of the packet is withdrawn from the "token bucket."

Should the PacketLength exceed the amount of CREDITS as determined in step 105, then packet has arrived at a point in time when it cannot immediately be sent (i.e., at the current system time) without exceeding the sustained rate. Therefore, a conformance time will be generated that is in the future from the current point in time. Under such a situation, it is common to drop or discard the packet since data may be being generated at a rate higher than can be maintained through the resource reservation. If the selective setting of discard is set to true as determined in step 107, then the packet will be discarded at step 108 before processing ends at step 109.

Otherwise, if packet discarding is not set at step 107, then the NextTokenTime (eventually to be used in the conformance time calculation) is calculated at step 110. The NextTokenTime is calculated according to the following equation:

$$NextTokenTime=CurrentTime+(PacketLength-CREDITS)/TokenRate$$

Where CurrentTime is a variable containing the current system time, PacketLength is a variable having the length of the received packet, CREDITS was previously calculated at step 104, and TokenRate is a variable representing the sustained rate supported by containing the rate at which tokens are added to the "token bucket." This NextTokenTime represents the earliest time at which the transmission of this packet will not exceed the sustained data rate as controlled by the token bucket algorithm. Finally, in this situation the "token bucket" has been completely emptied so that NextTokenCredits is set to zero at step 110.

At step 111, the conformance time is calculated by taking the largest value of either the NextTokenTime or NextDribbleTime variables and assigning it to the ConformanceTime variable. The NextDribbleTime variable represents the constraint placed on the conformance time by the peak rate in the leaky bucket algorithm. This assures that a burst of packets not exceed a certain peak rate. Therefore, the NextDribbleTime is calculated, also at step 111, for future use by the following equation:

$$NextDribbleTime=ConformanceTime+PacketLength/PeakRate$$

Where ConformanceTime variable contains the recently calculated conformance time, PacketLength is a variable containing the length of the current packet, and PeakRate variable contains the value of the peak rate at which data may be transmitted according to the leaky bucket algorithm.

Finally, the conformance time is associated with the packet and the packet is passed to the shaper component at step 112 after which processing then ends at step 109. Again, the flow chart of FIG. 4C is a specific implementation of the token bucket algorithm for a sustained rate limitation and a leaky bucket algorithm for a peak rate limitation that logically follows the processing steps of the flow chart of FIG. 4B. Those skilled in the art will recognize that other ways and means can be used to implement the flow chart of FIG. 4B or to implement the token bucket and leaky bucket algorithms in order to create a sustained rate/peak rate conformance algorithm.

For purposes of the conformer component, the default conformance algorithm as explained in connection with the flowchart shown in FIG. 4C provides a wide variety of different behavior depending upon the settings used. The traffic parameters representing the service requirements of a particular packet flow will be the flow settings for the token bucket/leaky bucket default conformance algorithm or the settings for whichever conformance algorithm is chosen and implemented for a particular situation. Those skilled in the art will appreciate that many ways exist to implement the token bucket and leaky bucket algorithms used together as explained and the processing steps of FIG. 4C are merely illustrative of one implementation that can be used.

Furthermore, those skilled in the art that more than one conformance time may be generated and associated with a particular packet. This could allow other components the option of using different conformance times during their processing as may be appropriate. For example, simultaneous algorithms could be used to meet the service requirements that would generate different conformance times that could be advantageously used by the shaper or sequencer component. One component could use one conformance time while the other component could use the other.

Figure 5:
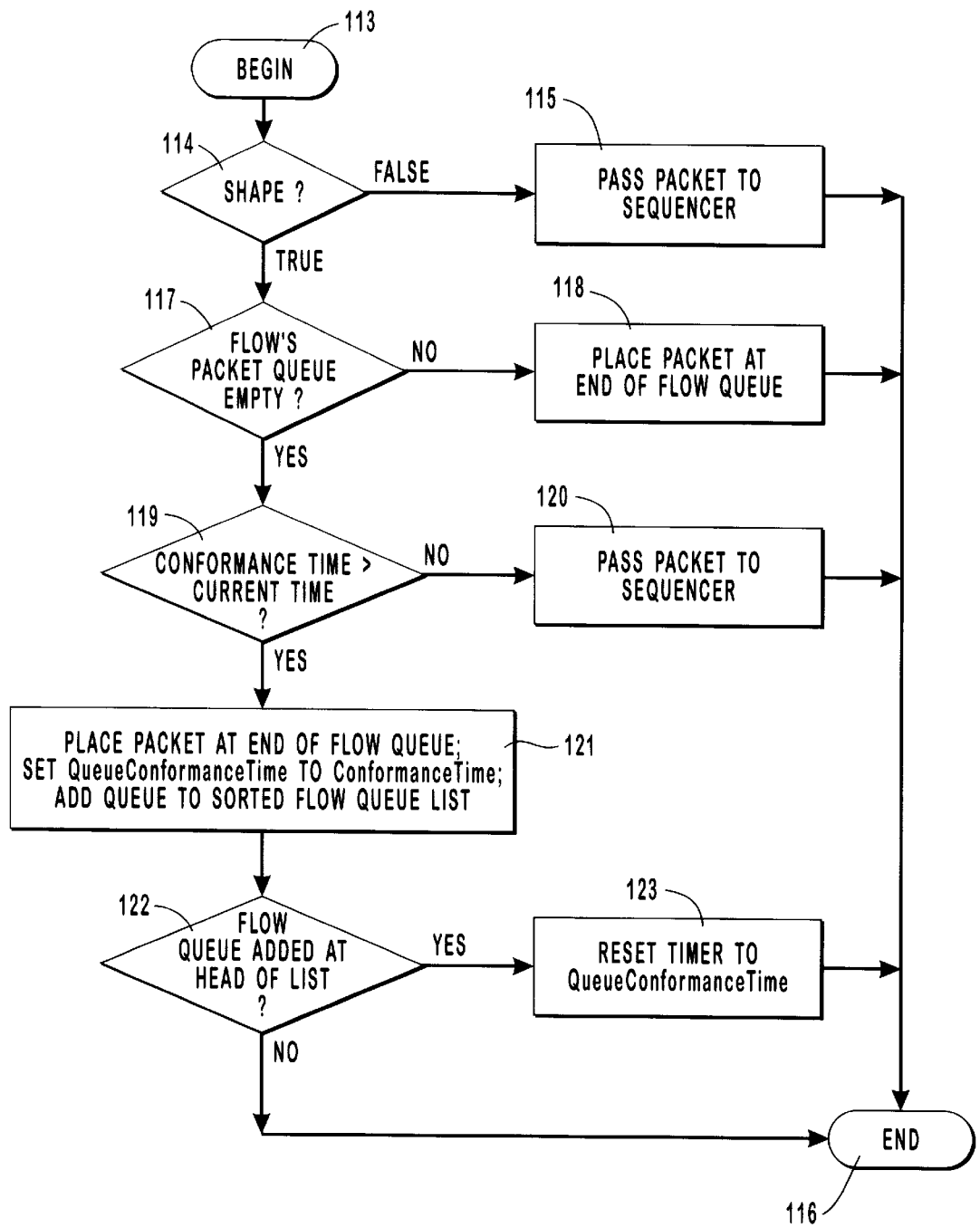
FIG. 5 is a flow chart depicting the processing steps taken by the shaper component when a packet is received for processing.
Figure 6:
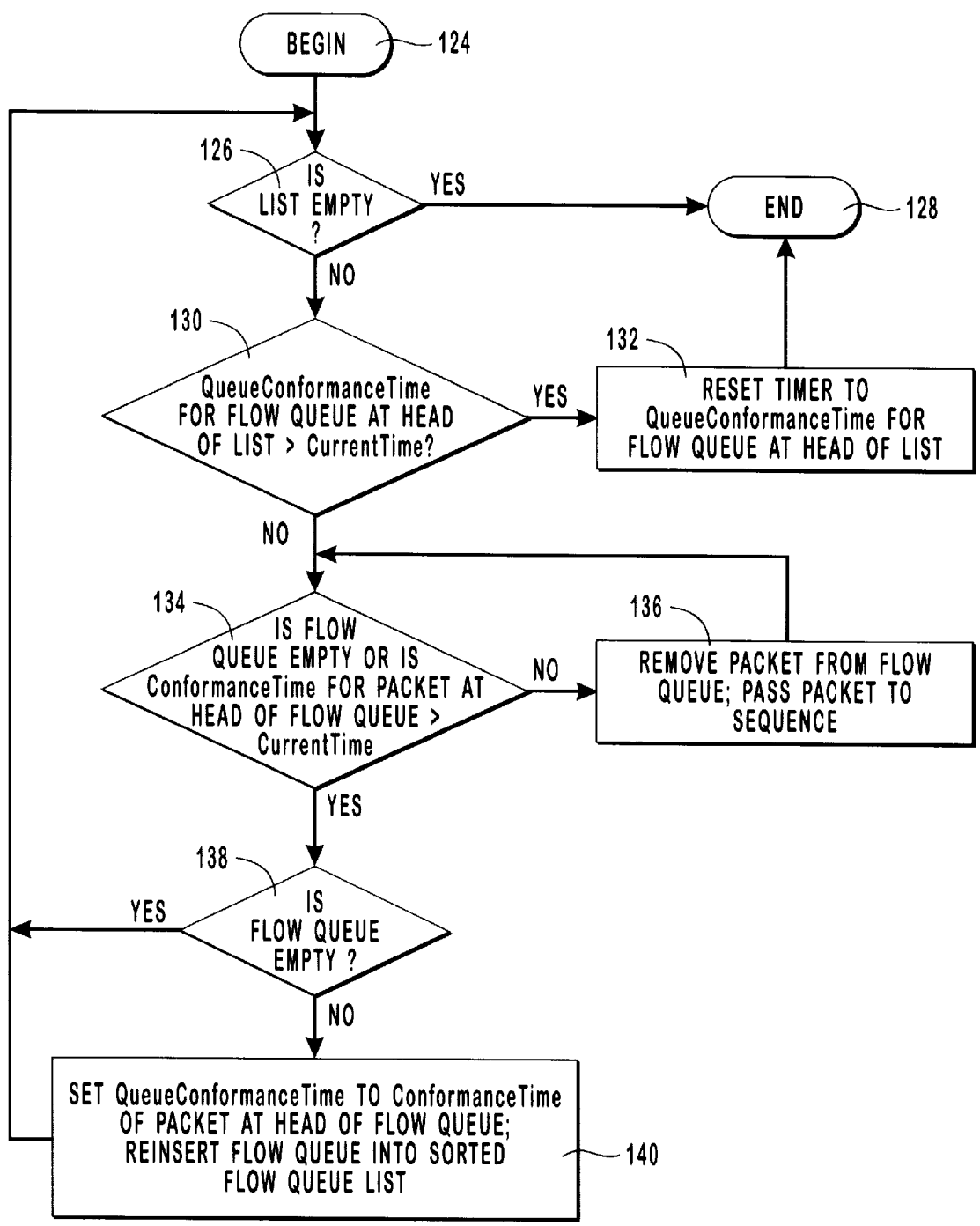
FIG. 6 is a flow chart depicting the processing steps taken by the shaper component when a timer expires thereby indicating processing is necessary for managing the shaper data structures.

FIGS. 5 and 6 are flow charts that describe the operation of the shaper component 76 (FIG. 3). Referring now to FIG. 5, the flow chart showing the processing steps taken when a packet is first received by the shaper component 76 is shown.

Processing begins at step 113 and the initial setting is checked at step 114 to see if the flow of packets is to be "shaped" (i.e., packets sent) in accordance with the conformance time. If shaping is not being performed and the determination is therefore false at step 114, the packet will be passed directly to the sequencer component at step 115 before processing ends at step 116. In other words, if shaping does not occur, the shaper component will simply pass the packet on down to the sequencer component or other processing component.

As part of the shaper component 76, a flow queue will be maintained for packets received from each packet flow in the system. At step 117 (FIG. 5) the packet flow to which the incoming packet pertains will be tested to see if it is empty. If it is not empty as determined at step 117, the incoming packet is placed at the end of the flow queue at step 118 and processing ends at step 116.

If the flow's packet queue is empty as determined at step 117, a determination must be made whether to send the packet on down to the sequencer or create a entry in the packet's flow queue based on whether the packet is already conforming with respect to the current time. At step 119 this determination is made by testing whether the conformance time for the packet is greater than the current time of the system. If the conformance time is not greater than the current time, this indicates that the packet need not be delayed and it is therefore sent or passed to the sequencer at step 120 before ending processing at step 116. If the conformance time is greater than the current time as determined at step 119, then the packet must be delayed until it is conforming before being passed to the sequencer.

At step 121, the packet is placed into the flow queue and the queue conformance time is set to the conformance time for the packet due to the fact that the packet is the only packet in the queue. Throughout this application, each non-empty packet queue will have a conformance time based upon the conformance time of the packet at the head of the queue. Furthermore, packets will be ordered sequentially in order of increasing conformance times within a given packet queue.

Finally, also at step 121, the flow queue is added to the sorted flow queue list. This is done so that the sorted flow queue list will be ordered allowing packets to be sent to the sequencer in conformance time order. The process of dequeueing and passing conforming packets from the flow queues will be shown in more detail with the examples explained in connection with FIGS. 7A through 7D hereafter.

At step 122, a determination is made whether the recently added flow queue is at the head of the sorted flow queue list. If it is not, no adjustments need to be made and processing ends at step 116. This is due to the fact that a prior packet on another flow queue will be serviced before a packet on the newly added flow queue. A newly added flow queue will be inserted at the head of the sorted flow queue list only if it has the closest conformance time to the current time.

If the new queue was added to the head of the flow queue list as determined at step 122, a timer is reset to expire at that queue's conformance time at step 123. This will allow the shaper component 76 (FIG. 3) to service the flow queue list at the appropriate time so that the earliest conforming packet may be serviced and sent to the sequencer component 78 (FIG. 3) when it becomes conforming. Once the timer is reset at step 123, processing ends at step 116.

Referring now to FIG. 6, the processing steps taken when the timer for the shaper component expires are shown. After beginning at step 124 the flow queue list is checked and a determination is made at step 126 whether that flow queue list is empty. If it is empty, then no packets are in the shaper waiting to go to the sequencer component and processing ends at step 128.

At step 130, a determination is made whether the queue conformance time of the flow queue at the head of the list is conforming so that packets may be sent to the sequencer. This is done by testing whether the queue conformance time is greater than the current time. If it is, then the timer is reset at step 132 to expire at the queue conformance time for the flow queue at the head of the list before processing ends at step 128. This typically occurs after one or more packets have been removed from the shaper and sent to the sequencer such that the queue conformance time for the flow queue at the head of the list is then greater than the current time of the system.

If the queue conformance time for the flow queue at the head of the list is not greater than the current time as determined at step 130, this indicates that at least one packet on the queue at the head of the list is conforming and ready to be sent to the sequencer. In step 134, a determination is made whether a packet needs to be sent from the flow queue to the sequencer. This is done by testing whether the flow queue is empty or if the conformance time for the packet at the head of the flow queue is greater than the current time. If this test is negative, the first packet from the flow queue is removed and passed to the sequencer component at step 136. Again, the determination at step 134 is made until the flow queue is empty or conformance time for the packet at the head of the flow queue is less than the current time as determined at step 134 to indicate no further packets exist on this queue or the queue has been completely processed.

At step 138, each particular flow queue is tested to see if it is empty. If it is empty, then the processing loops back to the determination of step 126 to see if the list of sorted flow queues is has been fully processed. Returning to the determination of step 138, if the flow queue is not empty, then the queue conformance time of the flow queue is set to the conformance time of the packet at the head of the queue and the flow queue is reinserted into the sorted flow queue list at step 140 at the location corresponding to the queue conformance time. At this point, the original sorted flow queue list is processed again at step 126 to see if there are any other queues to process. In this manner, all conforming packets are removed from their respective flow queues and sent to the sequencer and the timer is reset to expire at a later point for further processing.

Figure 7A:
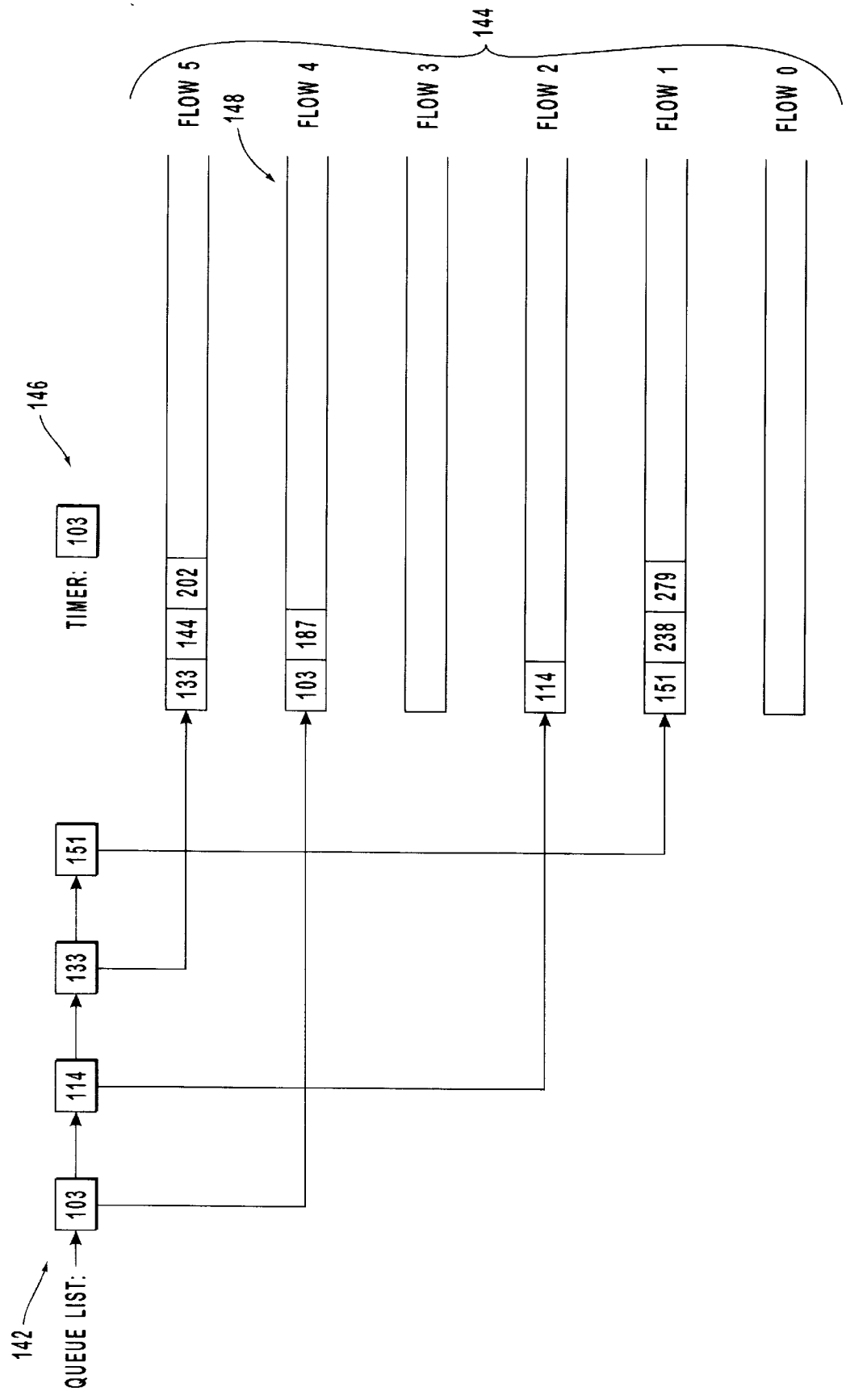
FIGS. 7A–7D are logical illustrations of the data structures used by the shaper component and show the progressive processing over time of packets from various flows.

In order to illustrate the operation of the shaper component as explained in the flow charts shown in FIGS. 5 and 6, examples are given that sequentially modify the shaper component data structures shown FIGS. 7A through 7D. Referring to FIG. 7A, a sorted flow queue list 142 has ascending values therein representing the conformance time value of the packets at the head of the respective flow queues 144. Furthermore, a timer 146 is set to expire at time 103 which corresponds to the queue conformance time of the flow 4 queue 148. The flow 4 queue 148 is at the head of the sorted flow queue list 142 and will be the first flow queue to be processed when the timer expires.

Figure 7B:
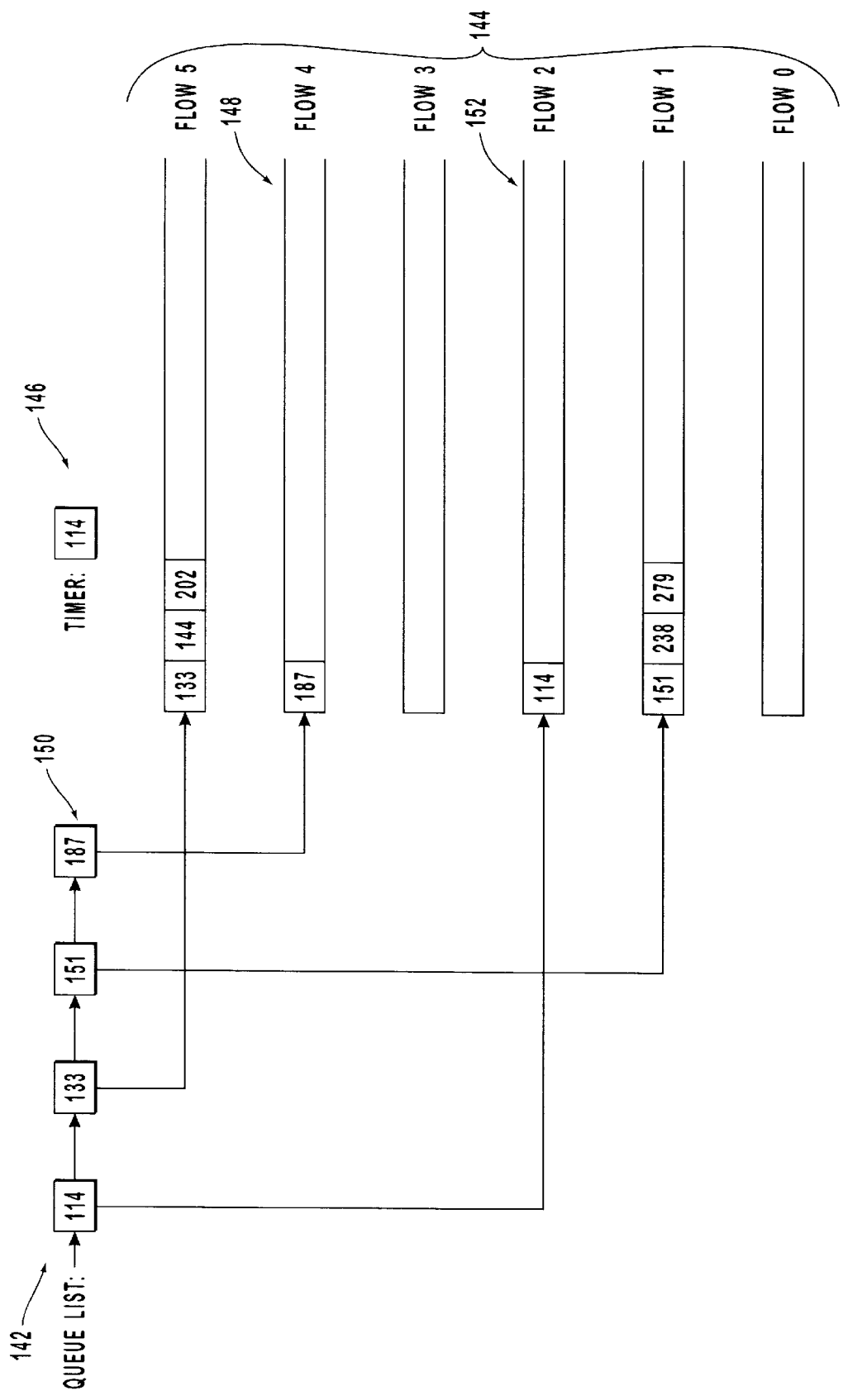

Referring now to FIG. 7B, the state of the data structures is shown after the timer expired at time 103 and the packet having a conformance time of 103 in the flow 4 queue 148 has been passed onto the sequencer. The processing between the data structures of FIG. 7A and 7B took place as follows according to the processing steps of the flowchart shown in FIG. 6. After beginning processing at step 124, the list was determined not to be empty at step 126, and the queue conformance time for the first flow queue in the list, namely flow 4 queue 148 having a value of 103, was not greater than the current time of 103. At step 134, it was determined that the flow 4 queue 148 was not empty and the queue conformance time was not greater than the current time of 103. Therefore, the packet at the head of the flow 4 queue 148 was removed at step 136 and passed onto the sequencer.

At that point, the packet at the head of flow queue 148 had a conformance time of 187 which was indeed greater than the current time of 103 such that processing is passed to step 138 following the test made at step 134. At step 138, the flow 4 queue 148 was determined not to be empty. At this point, the queue conformance time for the flow 4 queue 148 was set to the conformance time of the packet at the head of the flow queue, namely time 187, and the flow 4 queue 148 was reinserted into the sorted queue list 142 where it is the very last queue member 150 as shown in FIG. 7B.

The sorted queue list 142 as shown in FIG. 7B was then processed again at step 126 where the list was determined not to be empty. The queue conformance time for the flow queue at the head of the list, namely time 114 for flow 2 queue 152, was greater than the current time of 103. Therefore, the timer 146 was reset to expire at the queue conformance time for flow 2 queue 152 at step 132 before processing ended at step 128. At this point, all the data structures are in the state shown in FIG. 7B.

Figure 7C:
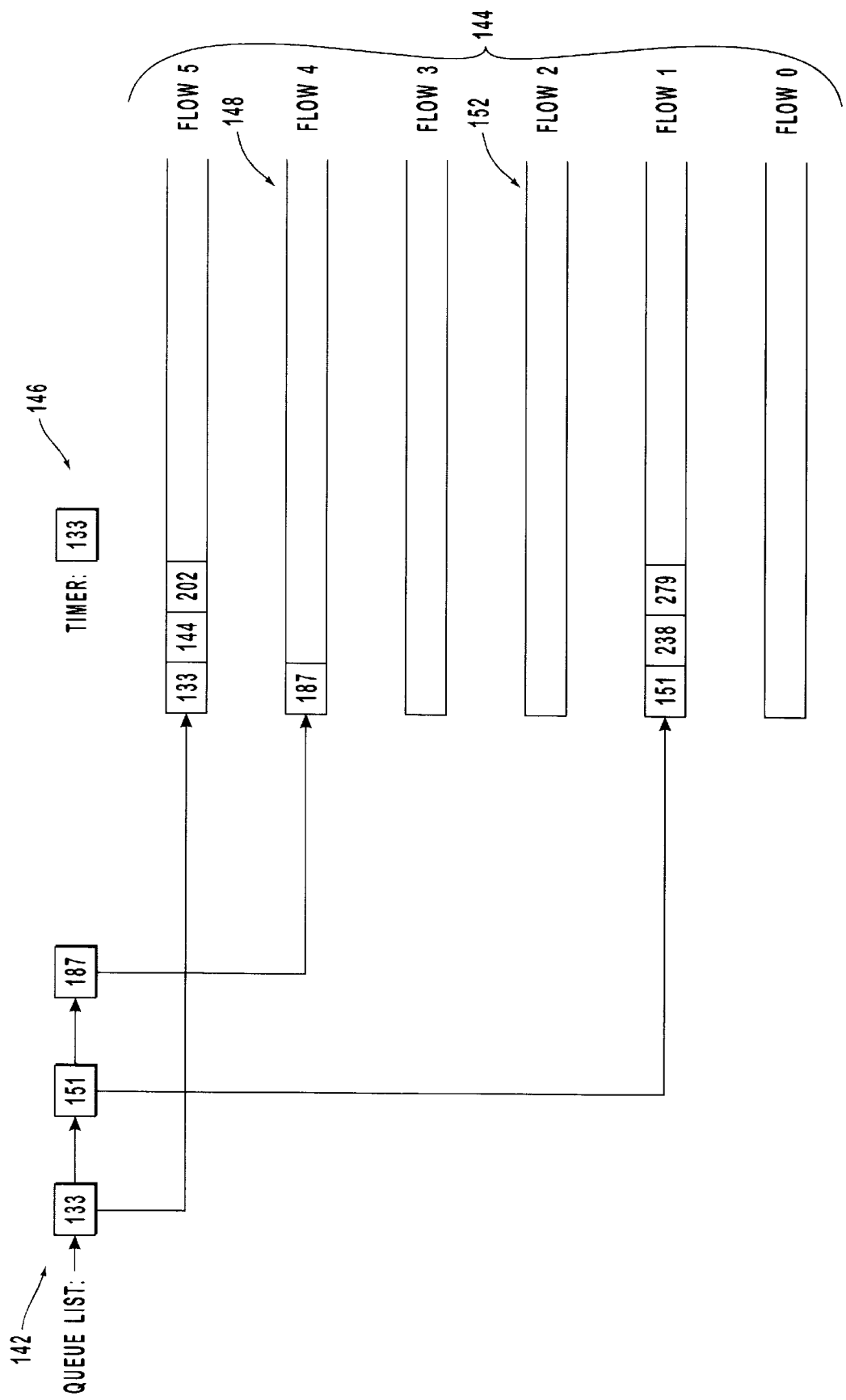

FIG. 7C shows the shaper data structures after the removal of the packet having a conformance time of 114 from flow queue to 152 after the expiration of the timer at time 114. The same steps as explained previously for the processing of flow 4 queue 148 were performed except that the flow 2 queue 152 now remains empty and the sorted queue list 142 has only three members. Again, the timer 146 is updated based on the queue conformance time of the flow queue at the head of the sorted queue list 142, which in this case would be time 133.

Figure 7D:
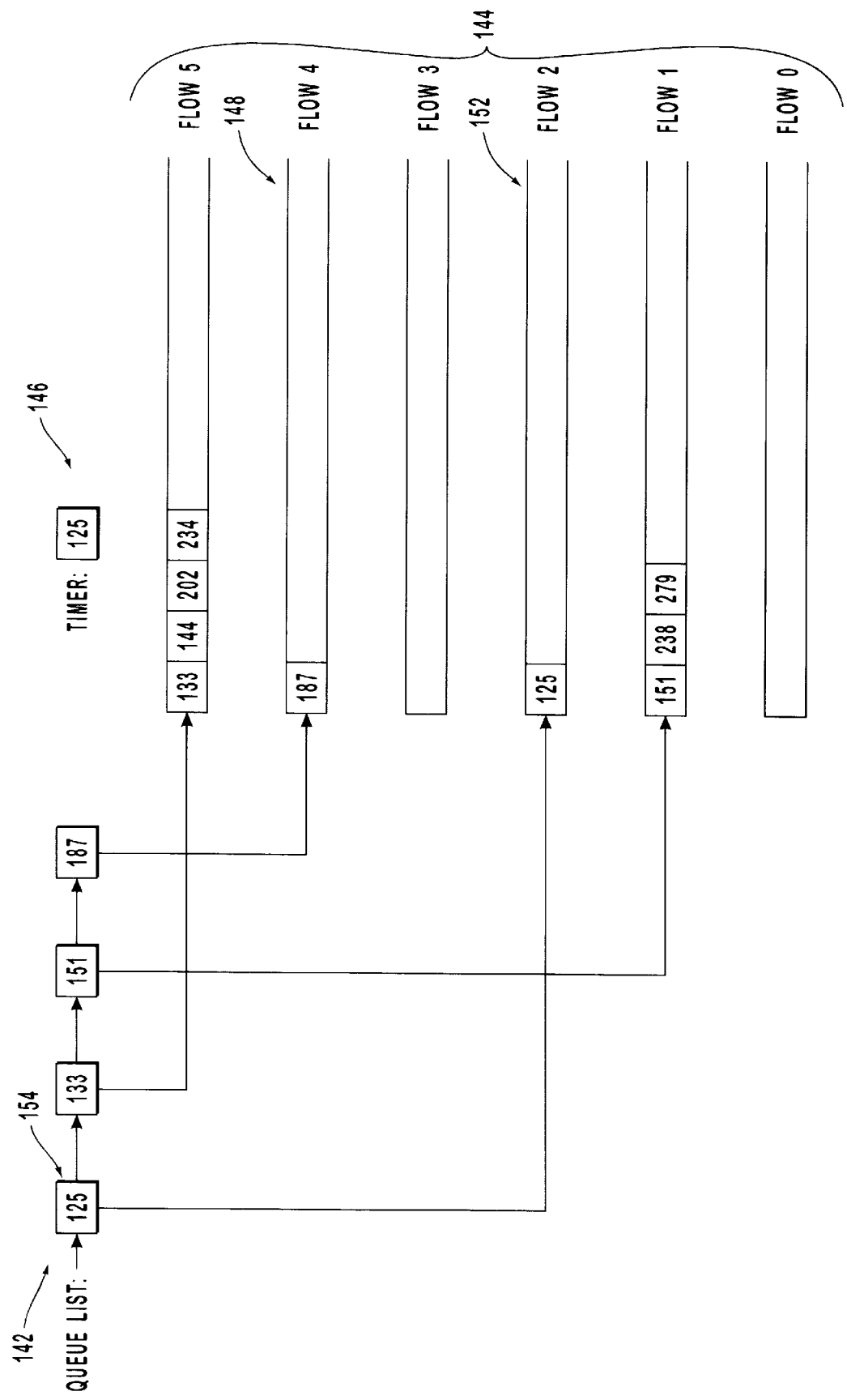

Referring now to FIG. 7D, the state of the data structures of the shaper component are shown after the receipt of a new packet before the expiration of the timer 146 as it stood in FIG. 7C. This processing will begin with the data structures in the state shown in FIG. 7C and followed by the receipt of a packet flow 2 having a conformance time of 125 that occurs sometime between time 114 and 125.

The processing steps of the flowchart shown in FIG. 5 are followed wherein processing begins at step 113 and shaping is determined to be turned on for flow 2 at step 114. At step 117, flow 2 queue 152 was found to be empty requiring the test of step 119 to determine whether the conformance time of the newly received packet was greater than the current time. Since the packet was received between time 114 and time 125 and had a conformance time of 125, the processing of step 121 is followed so that the packet is placed at the end of flow 2 queue 152 at step 121. Also, at step 121 the flow 2 queue 152 queue conformance time is set to the conformance time of the newly added packet, namely 125, and the queue is placed into the sorted flow queue list 142 as the head member 154. Finally, since the flow queue was added at the head of the list as determined in step 122, the timer 146 will be set to expire at the queue conformance time for flow 2 queue 152 at step 123 so that the timer 146 is set to expire at time 125 as shown in FIG. 7D.

Figure 8:
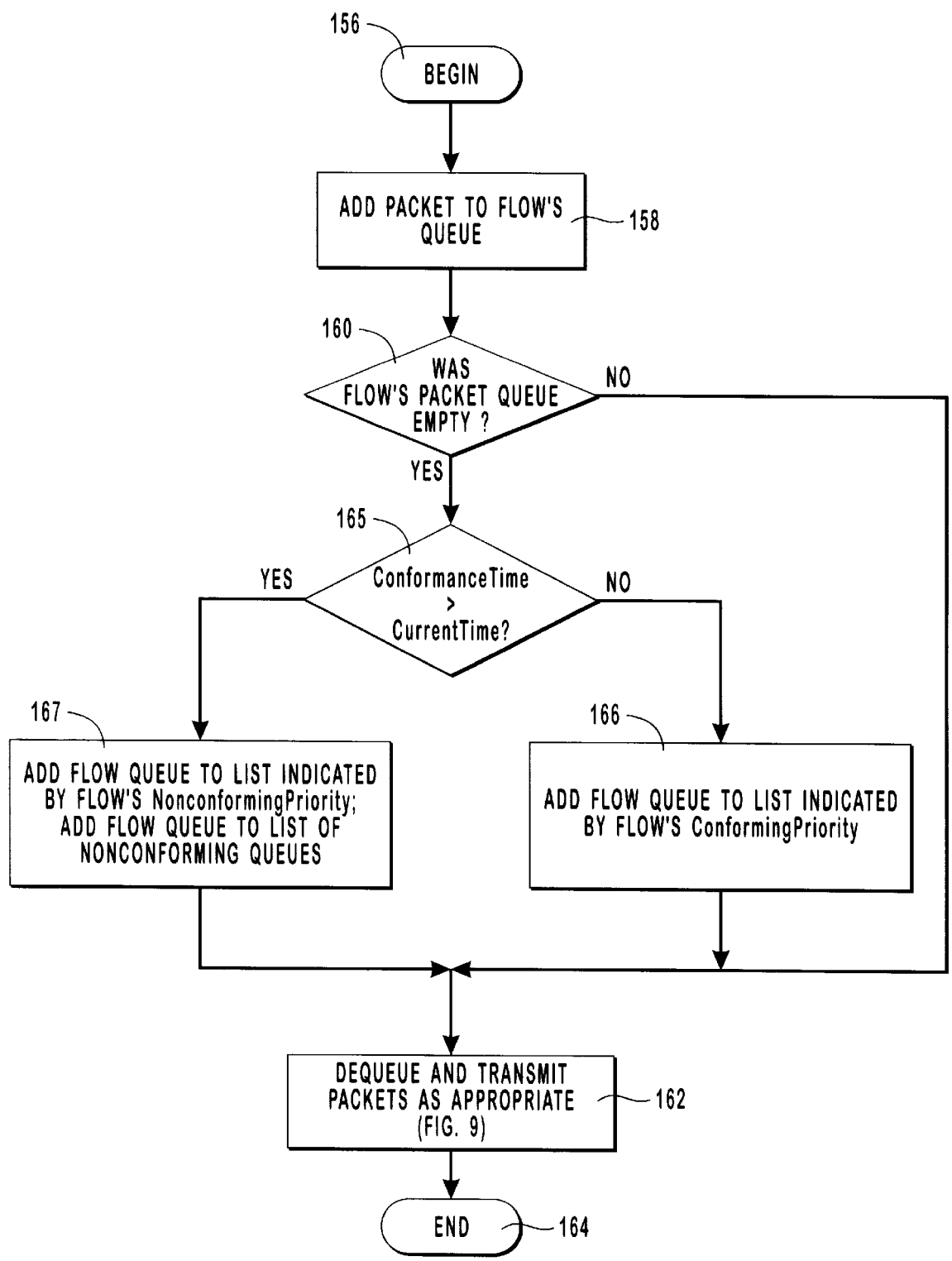
FIG. 8 is a flow chart depicting the processing steps performed when a packet is received by the sequencer component.
Figure 9:
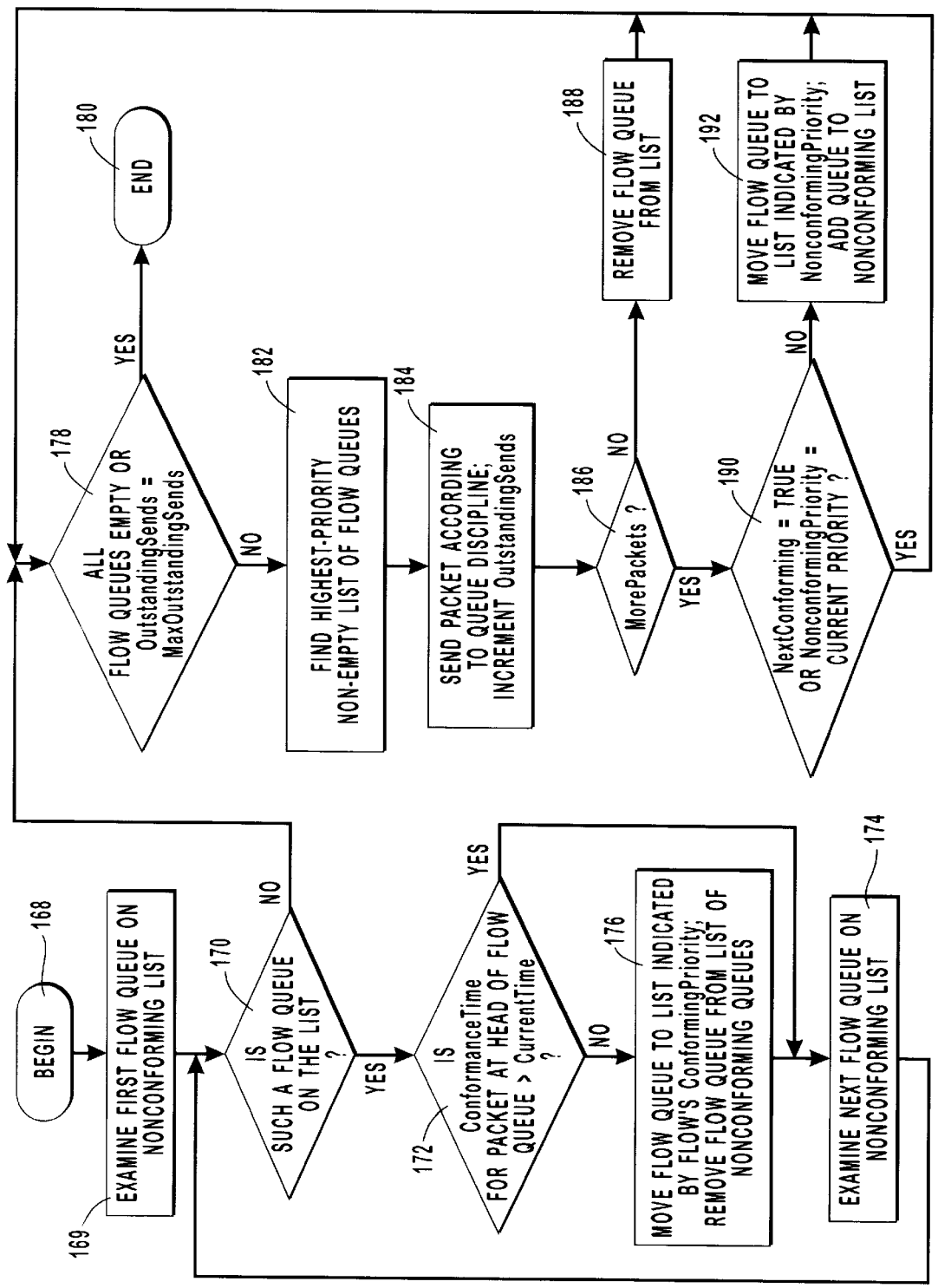
FIG. 9 is a flow chart depicting the processing steps performed by the sequencer component when a transmission of packets has been completed by the network interface hardware so that more packets may be sent to the network interface or as part of receiving a new packet by the sequencer component.

Referring now to the flowcharts shown FIG. 8 and FIG. 9, the operation of the sequencer component is shown in greater detail. Referring to the flowchart shown in FIG. 8, the processing steps taken when a packet is first received by the sequencer component are explained in detail. After beginning at step 156, the newly received packet is added to a queue data structure for the particular flow to which it pertains at step 158. At step 160, a determination is made as to whether the packet flow queue was empty prior to receiving the packet. If the packet flow queue was not empty, then packets are dequeued and passed to the network interface as appropriate at step 162 according to the flow chart shown in FIG. 9 that will be explained in more detail hereafter. Finally, processing will end at step 164.

Should the packet flow queue be determined to be empty at step 160 prior to the receipt of the new packet, it is necessary to determine whether or not the newly existing packet flow queue has conforming or nonconforming packets. Different priority lists for flow queues are maintained by the sequencer and each flow has a priority for conforming packets and a priority for nonconforming packets. At step 165, the conformance time of the packet at the head of the queue (the newly received packet) is compared with the current time and if less than the current time, then the queue would be a conforming queue. Therefore, the flow queue would be added to the priority list indicated by the flow's conforming priority at step 166. At this point, packets can be dequeued and transmitted as appropriate at step 162 before processing ends at 164.

Should the conformance time be greater than the current time as determined at step 165, then the queue is nonconforming and is added to the priority list indicated by the flow's nonconforming priority at step 167. Also at step 167, the flow queue is added to a nonconforming queue list that is used to accelerate processing. Finally, packets can be dequeued and transmitted as appropriate at step 162 before processing ends at step 164.

Referring now to FIG. 9, the processing steps for dequeueing and transmitting packets is explained in more detail. These processing steps are taken as part of the receipt of a new packet as shown in step 162 of FIG. 8 or in response to a send complete event from the network interface indicating that the network interface is ready to receive more packets for transmission. In the latter case, a variable representing the number of packets outstanding in the network interface is first decremented by one before beginning the steps of FIG. 9.

Processing begins in either case at step 168. Initially, the nonconforming queue list, conveniently referred to as the nonconforming list, is processed by examining the first flow queue on the list at step 169. The entire nonconforming list will be exhaustively reviewed prior to sending packets to the network interface for transmission so that any flow queues that have become conforming with the passage of time may be properly placed in their respective priority list before actual packets are sent. Step 170 will break out of the loop only when there are no further flow queues to process.

If there is a flow queue as determined in step 170, the queue is checked to see if it is now conforming. This determination occurs at step 172 where the conformance time for the packet at the head of the flow queue is compared with the current time. If the conformance time is greater than the current time, then the queue continues to be nonconforming and processing passes to step 174. At step 174, the process repeats itself with an examination of the next flow queue on the nonconforming list.

If, at step 172, the conformance time is not greater than the current time, then the flow queue is determined to now be conforming and processing passes to step 176 where the flow queue is moved to the list indicated by the flow's particular conforming priority. Furthermore, the flow queue is removed from the list of nonconforming queues. Again, processing continues through the nonconforming list by examining the next flow queue on the nonconforming list at step 174.

Eventually, the nonconforming queue list is completely processed and there will be no remaining flow queues on the list as determined in step 170 thereby allowing processing to pass to step 178. This marks the beginning of the priority list processing. At step 178, a determination is made as to whether there exist packets for transmission or whether processing should end. Processing should end when there are no more packets to send or the outstanding number of packet sends has reached the level of a predetermined maximum. If either of these two conditions are true, namely all flow queues being empty indicating that no packets exist in the sequencer for transmission through the network interface or that the number of outstanding packet sends has reached the predetermined maximum indicating that the network interface is busy, then processing will end at step 180.

If there are packets for transmission and conditions are right for transmission as determined at step 178, then the highest priority, non-empty priority list of flow queues, conveniently called a priority list, is found at step 182. This list of flow queues or priority list will be processed iteratively until no flow queues remain in the list or processing ends due to the conditions for step 178 being met.

At step 184, a packet is sent to the network interface according to the queue discipline associated with the priority list. Additionally, the number of outstanding packet sends is incremented, also at step 184. Note that a number of different queue disciplines may be used for processing the flow queues in the priority list. One example is a round robin queue discipline where a packet is sent in alternating fashion from each queue in the priority list until each queue has been serviced before a given queue is serviced again. One variation on such a round robin arrangement is the deficit round robin queue discipline. Both the round robin and deficit round robin queue disciplines are well known in the art. Yet another common queue discipline is a conformance time sequential discipline based on queue conformance time so that packets are sent to the network interface in conformance time order. Those skilled in the art will recognize that many variations as to the queue discipline may be instituted and may yet be developed that can be used in accordance with the present invention. Detailed explanation of how the round robin, deficit round robin, and the conformance time sequential queue disciplines may be implemented in a sequencer component will be explained in more detail hereafter.

Once the packet has been sent at step 184, a determination is made at step 186 if there are more packets existing in the flow queue at step 186. If there are no more packets, the flow queue is removed from the priority list at step 188 and processing returns to step 178 to iterate the processing. If there are more packets in the flow queue as determined in step 186, then processing continues to step 190 where a determination is made whether the flow queue should be moved from the current priority list to another priority list based on a change from a conforming queue to a nonconforming queue. This determination is made at step 190 by testing whether the next packet is still conforming or, if the next packet is nonconforming, whether the nonconforming priority is the same as the current priority. Should either of these conditions be true then a change of queue priority with the attendant move to a different priority list is not necessary and processing may continue to iterate by returning to step 178.

Otherwise, if the next packet in the flow queue requires the queue to be changed to a different priority list then processing passes to step 192 where the flow queue is moved to the list indicated by the nonconforming priority and the queue is also added to the nonconforming list. At this point, the data structures for the sequencer component are up to date and ready for continued processing. Note that a particular flow queue will migrate among priorities depending upon the current time of the system so that its status changes between conforming and nonconforming.

Figure 10A:
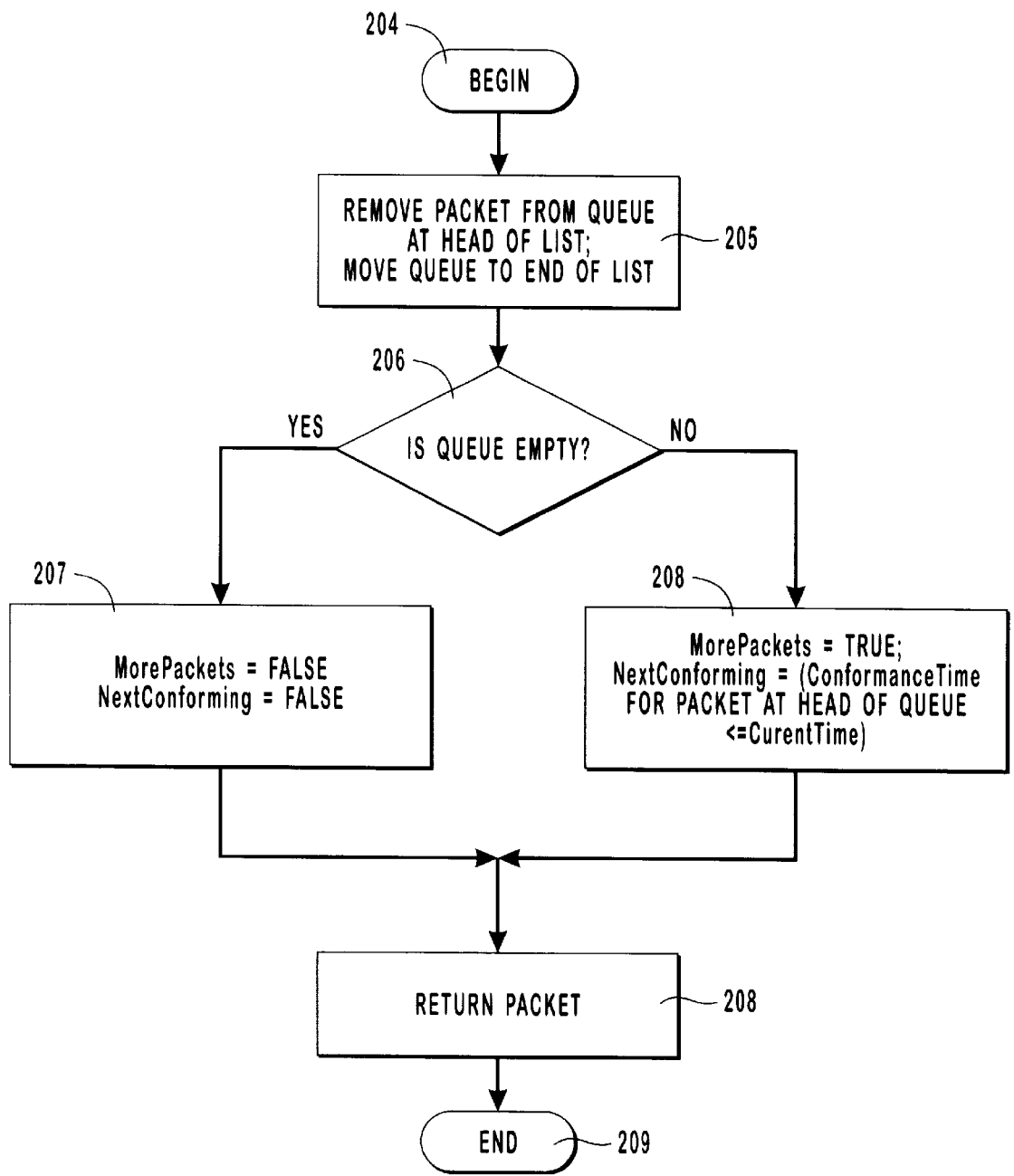
FIGS. 10A–10C are flow charts depicting the processing steps performed by one embodiment of the sequencer component that institute different queue disciplines for managing the sequence that packets on a queue list are sent over a communications network. More specifically.
Figure 10B:
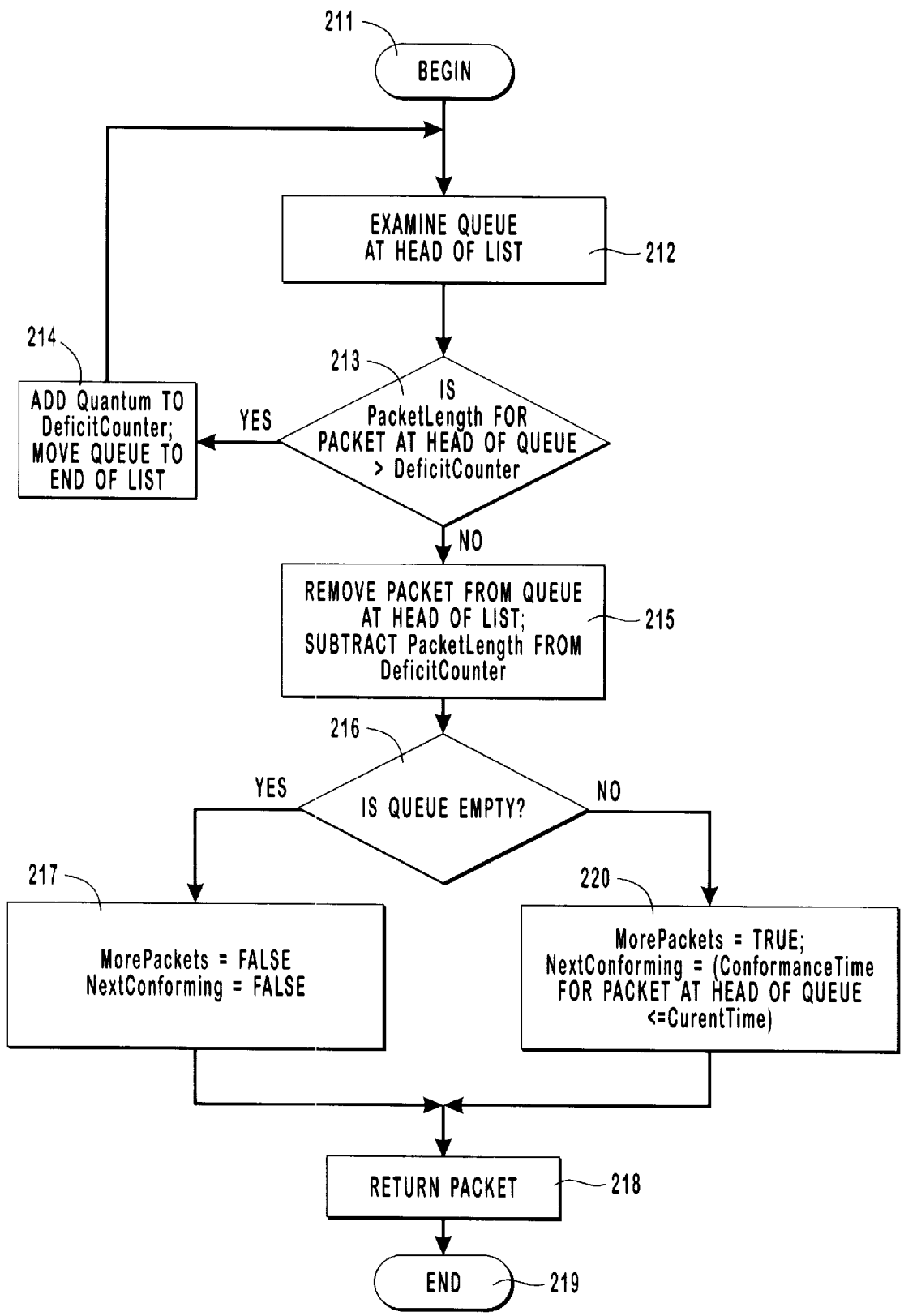
Figure 10C:
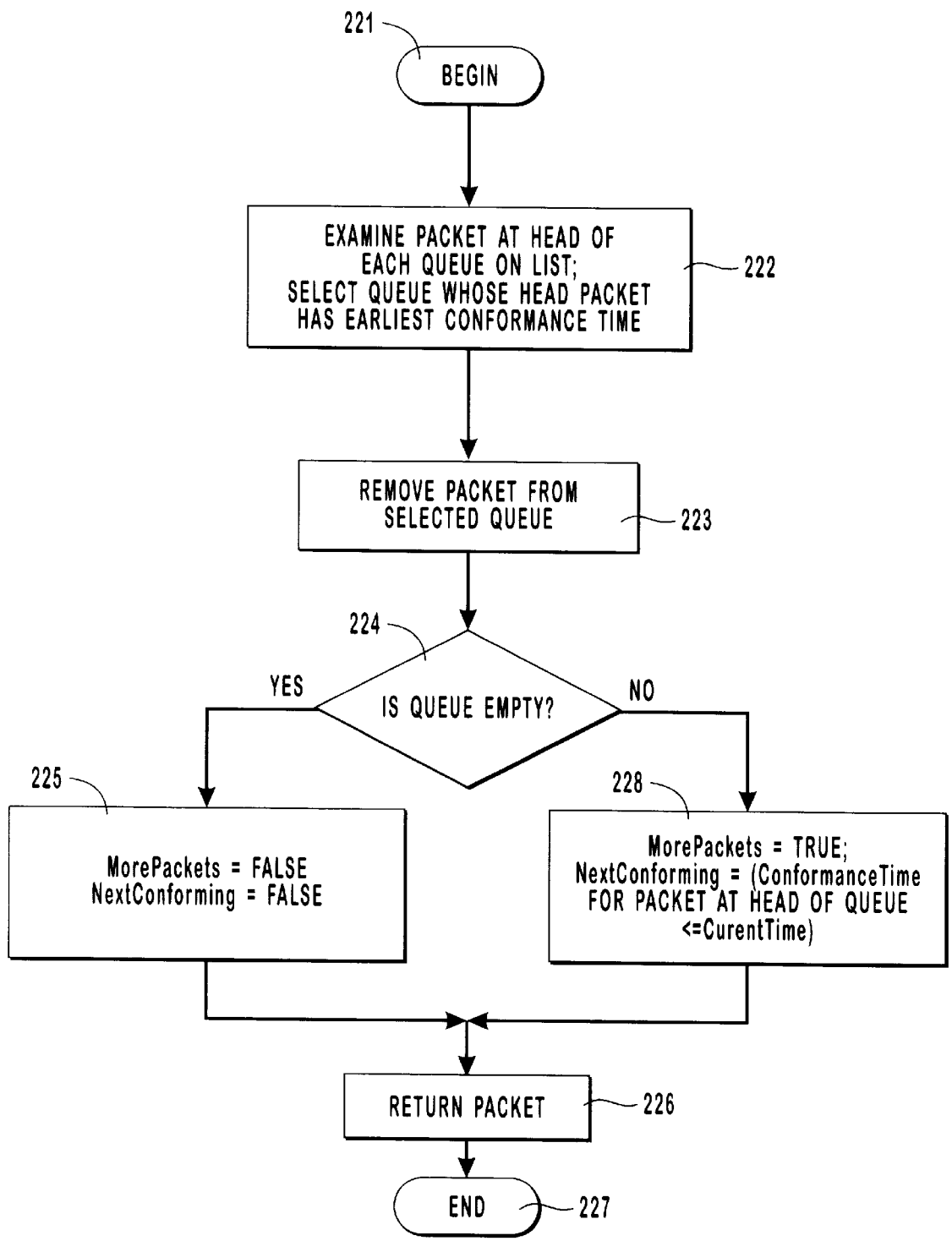

Referring now to FIGS. 10A through 10C, a number of queue disciplines that have been implemented in one exemplary embodiment of the invention are shown. Note that the same queue disciplines may be implemented in other ways as will be appreciated by those skilled in the art. For this one particular embodiment, each queue discipline will provide a RetrievePacket method that will return a packet from the queue according to the respective queue discipline along with two boolean values. These boolean values are a MorePackets value which indicate that there are more packets on this particular queue and the NextConforming value which indicates whether the next packet on the queue is conforming with respect to the current system time. These boolean values are used by the sequencer component to assist in migrating the queues between the different priority lists based on their having packets and those packets being conforming or nonconforming. FIGS. 10A through 10C illustrate the operation of the RetrievePacket method that implements the respective queue discipline.

Referring now to FIG. 10A, a flowchart explaining the processing steps used for a RetrievePacket method that implements a round robin queue discipline is shown. After beginning at step 204, a packet is removed from the queue at the head of the list at step 205. Next, the queue from which the packet was removed is then moved to the end of the list. This will cause the round robin effect by taking one packet from each queue in sequential fashion between the different queues having packets. No queue will be serviced a second time until all queues having packets have been serviced once.

At step 206, a determination is made whether the queue is now empty due to the removal of the packet at step 205. If the queue is empty, then there will be no more packets processed until more packets are added to the queue. Because of this, the MorePackets variable and the NextConforming variable will both be set to 'false' at step 207. Next, the packet along with the two variables is returned at step 208 to the invoker of the RetrievePacket method before processing ends at step 209.

If the queue is not empty as determined at step 206, then the MorePackets variable is set to 'true' at step 208. Furthermore, the NextConforming variable will be set to either 'true' or 'false' depending on the conformance time of the packet at the head of the queue in comparison with the current system time. Finally, once the two boolean variables are set, the packet along with the variables are returned to the invoker at step 208 before processing ends at step 209. Note that the RetrievePacket routine would be used in connection with the send packet processing step 184 as shown in the flowchart of FIG. 9.

Referring now to FIG. 10B, a flowchart explaining the processing steps of a RetrievePacket method implementing a deficit round robin queue discipline is shown. Essentially, a deficit round robin queue discipline allows the bandwidth of a communications network to be shared proportionally among the different flow queues. In other words, a proportional amount of data is sent from each flow queue regardless of how many packets may make up that quantity. One benefit of a deficit round robin queue discipline is to prevent one flow queue having relatively large size packets taking a disproportionate amount of the available bandwidth from one or more other flow queues having relatively smaller size packets as would occur if a strict round robin queue discipline were followed. It is common to employ the deficit round robin queue discipline for the lowest priority queue list in such a way so that all flow queues access the available bandwidth equally.

The processing steps of FIG. 10B show one way of implementing the deficit round robin queue discipline but those skilled in the art will realize that other ways exist as well. A DeficitCounter variable is maintained for each queue and a packet may not be sent until the DeficitCounter variable has a value greater than or equal to the size of the packet (as indicated by the PacketLength variable. After beginning at step 211, the queue at the head of the list is examined at step 212. The PacketLength for the queue at the head of the list is compared at step 213 to determine if it is greater than the value of the DeficitCounter variable. If it is, indicating that the DeficitCounter variable must be incremented at this time rather than sending the packet, a Quantum value is added to the DeficitCounter variable at step 214. The queue is then moved to the end of the list, also at step 214, before processing continues by examining the next queue in the list, again at step 212.

The Quantum value is calculated according to the following equation:

$$\text{Quantum} = \text{MinimumQuantum} * \text{TokenRate}_{flow} / \text{MIN}(\text{TokenRate}_{1 \text{ to } N})$$

where MinimumQuantum is a system variable set to the minimum amount that may be selected for a quantum, $\text{TokenRate}_{flow}$ is a variable that indicates the sustained rate for this flow, and $\text{MIN}(\text{TokenRate}_{1 \text{ to } N})$ is the minimum value taken from all TokenRate variables for each and every flow queue in the list. The TokenRate is the nominal traffic rate of the is flow and will typically be set equal to the TokenRate parameter found in the default conformance algorithm of the conformer component and represents a sustained data rate. Note also that the DeficitCounter variable indicates the number of bytes that may be sent from the flow queue when it is next serviced. That is why the flow queue cannot be serviced unless the size of the data packet is less than the DeficitCounter variable. Using the Quantum value ensures that the flow queues share the available bandwidth in a proportional fashion according to their individual TokenRate settings.

If at step 213, the size of the packet (using the PacketLength variable) at the head of the queue is less than or equal to the DeficitCounter variable, then the packet may be sent. This occurs at step 215 where the packet is removed from the queue at the head of the list and the PacketLength variable is subtracted from the DeficitCounter variable.

At step 216, a determination is made whether the queue is now empty due to the removal of the packet at step 215. If the queue is empty, then there will be no more packets processed until more packets are added to the queue. Because of this, the MorePackets variable and the NextConforming variable will both be set to 'false' at step 217. Next, the packet along with the two variables is returned at step 218 to the invoker of the RetrievePacket method before processing ends at step 219.

If the queue is not empty as determined at step 216, then the MorePackets variable is set to 'true' at step 220. Furthermore, the NextConforming variable will be set to either 'true' or 'false' depending on the conformance time of the packet at the head of the queue in comparison with the current system time. Finally, once the two boolean variables are set, the packet along with the variables is returned to the invoker at step 218 before processing ends at step 219.

Referring now to FIG. 10C, a flowchart explaining the processing steps for a RetrievePacket method implementing a conformance time sequential queue discipline is shown. After beginning at step 221, the packet at the head of each queue on the list is examined at step 222. Note that this requires traversing the entire list in order to examine each and every queue. Also at step 222, the queue is selected whose head packet has the earliest conformance time. That packet is removed from the selected queue at step 223.

At step 224, a determination is made whether the queue is now empty due to the removal of the packet at step 223. If the queue is empty, then there will be no more packets processed until more packets are added to the queue. Because of this, the MorePackets variable and the NextConforming variable will both be set to 'false' at step 225. Next, the packet along with the two variables is returned at step 226 to the invoker of the RetrievePacket method before processing ends at step 227.

If the queue is not empty as determined at step 224, then the MorePackets variable is set to 'true' at step 228. Furthermore, the NextConforming variable will be set to either 'true' or 'false' depending on the conformance time of the packet at the head of the queue in comparison with the current system time. Finally, once the two boolean variables are set, the packet along with the variables are returned to the invoker at step 226 before processing ends at step 227.

Figure 11:
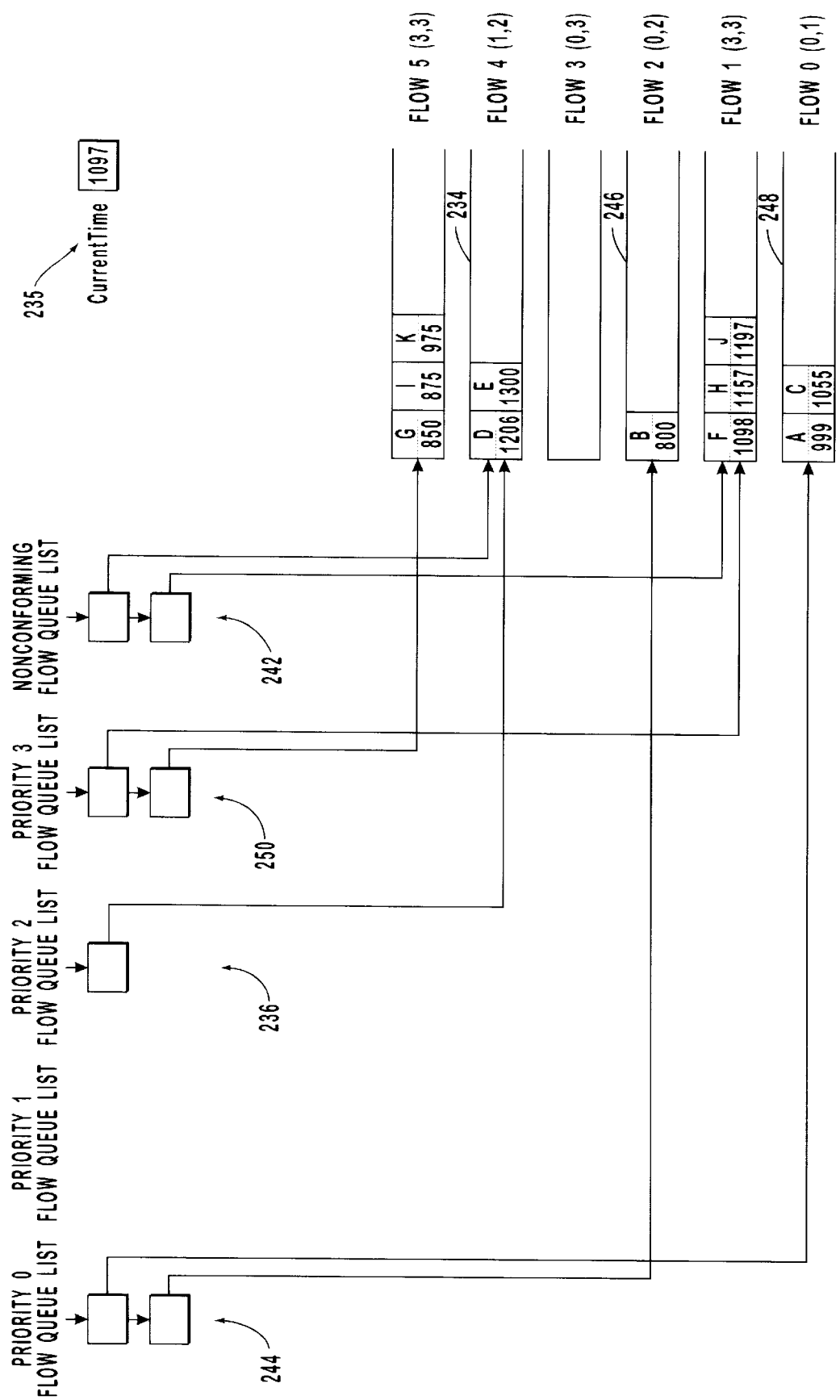
FIG. 11 is a logical diagram showing the data structures used by the sequencer component and illustrating a number of flows having packets with different times therein. Further, the ordering of the packets for transmission are shown by the letters above the conformance time.

In order to illustrate the operating of processing steps of the sequencer component as explained in the flowcharts of FIG. 8 and FIG. 9, the logical diagrams of FIG. 11 and FIGS. 12A through 12H showing the operation of the data structures are presented. Referring now to FIG. 11, the general procedure for the sequencing of the various flow queues based on their being in particular priority lists is shown. Please note that a lower numeric value for priority indicates higher priority (e.g. priority 0 is the highest while priority 3 is the lowest).

Each flow has a flow queue, a conforming priority, and a nonconforming priority associated therewith. The priority indicates the priority list to which the flow queue will belong when packets are found therein. For example, flow 4 queue 234 has a conforming priority of 1 and a nonconforming priority of 2 as can be seen in the parentheses alongside flow 4. Since the two packets found in the flow 4 queue 234 have conformance times greater than the current time 235, flow 4 queue 234 is in the priority 2 flow queue list 236 also known as the priority 2 list 236 for convenience.

When following the processing steps in FIG. 9 at a current time 235 of 1097, no adjustments are needed for the nonconforming list that entails steps 166 through step 176. Therefore, processing will effectively start at step 178 for dequeueing and sending packets to the network interface. This process will iterate in this instance until all packets are sent from all queues. This occurs because there are a total of 11 packets, labeled A through K, and the system as it is currently as shown in FIG. 11 will send all of them over the communications network.

Since the nonconforming list 242 requires no processing, processing will arrive at step 182 to find the highest priority list having non-empty flow queues therein, namely the priority 0 list 244. Priority 0 list 244 contains flow 2 queue 246 and flow 0 queue 248. Assuming a straight-forward round-robin queue discipline, the packets will be sent in alternating fashion from flow 2 queue 246 and flow 0 queue 248 until packets from those queues are transferred. Each packet sent corresponds to the execution of the processing steps 178, 182, 184, 186, and 190 (all shown in FIG. 9). When the flow 2 queue 246 and flow 0 queue 248 are empty, they will be removed from the priority 0 list 244 at step 188. The processing will occur each time the network interface indicates a send complete that makes known to the sequencer component that a packet may be sent.

In like manner, the priority 2 list 236 and the priority 3 list 250 will also be processed in succession. The net result of the sequence or handling of the transmission of the packets will be that the packets are sequentially sent to the network interface in alphabetical manner beginning with packet A and ending with packet K. The example shown in FIG. 11 is relatively simplified since the flow queues, such as flow 4 queue 234 do not switch priority during the sending of the packets. At the conclusion of the processing, all flow queue, priority lists, and the nonconforming list will be emptied.

FIGS. 12A through 12H illustrate the processing of the sequencer in more detail and under more complex situations.

Figure 12A:
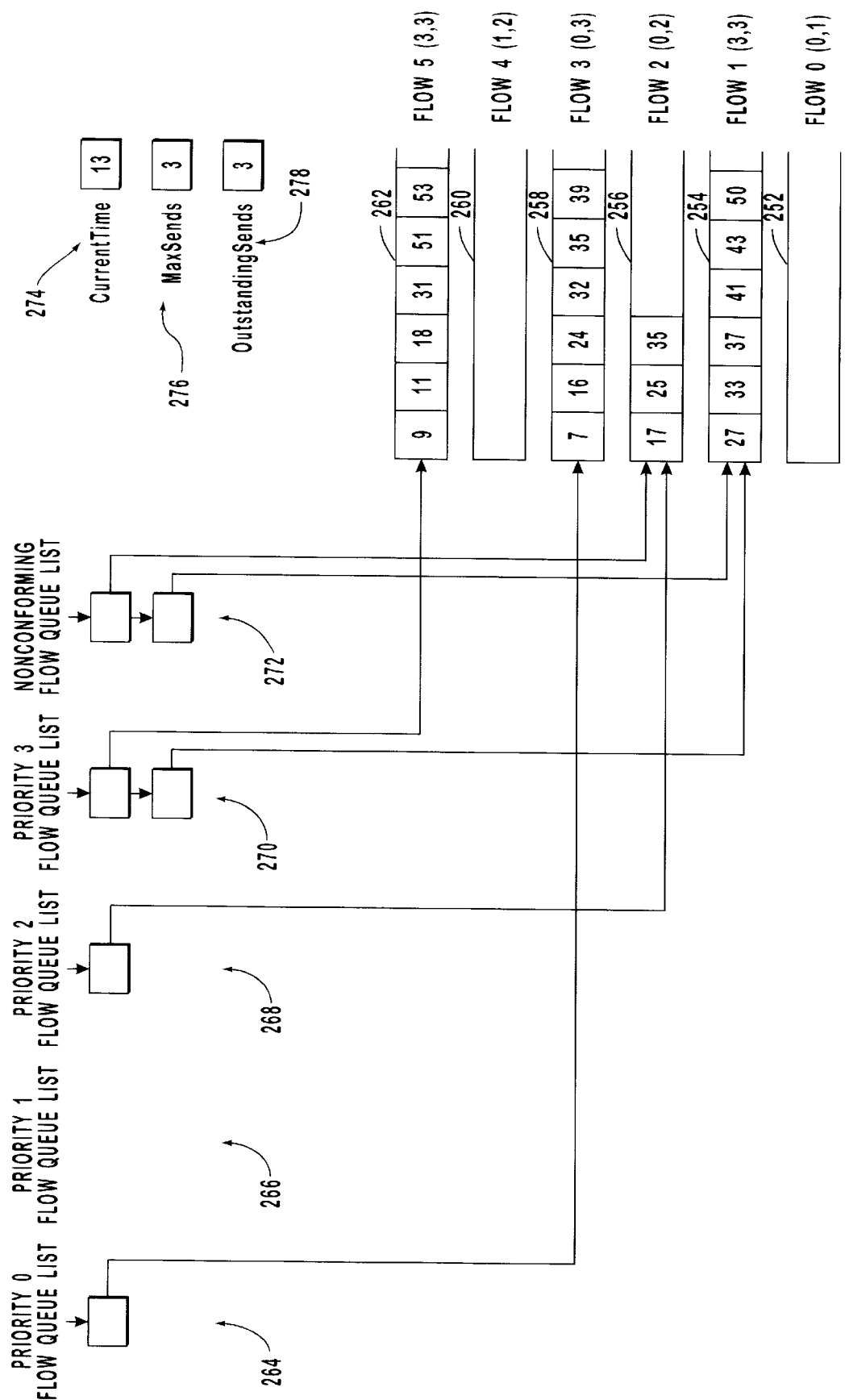
FIGS. 12A through 12H are a series of instances of the data structures used by the sequencer component and are presented to illustrate the operation of the sequencer according to the flow charts of the FIGS. 8 and 9.

In FIG. 12A, the initial state is shown, wherein there are six flows associated with the sequencer component. Flow 0 has a flow 0 queue 252, a conforming priority of 0, and a nonconforming priority of 1 and is currently empty. Flow 1 has a flow 1 queue 254, a conforming priority 3, and a nonconforming priority of 3 and contains 6 packets having conformance times ranging from 27 to 50. Flow 2 has a flow 2 queue 256, a conforming priority of 0, and a nonconforming priority of 2 and contains three packets. Flow 3 has a flow 3 queue 258, a conforming priority of 0, a nonconforming priority of 3, and contains 5 packets. Flow 4 has a flow 4 queue 260 that is empty, a conforming priority of 1, and nonconforming priority of 2. Finally, flow 5 has a flow 5 queue 262, a conforming priority of 3, and nonconforming priority of 3, and six packets contained therein.

As explained previously, all packets in a particular flow queue will be ordered sequentially and the flow queue will have its priority based on the conformance time of the particular packet at the head of the flow queue. Whether that packet is conforming or nonconforming is determined by comparing the conformance time for that packet with the current time of the system as explained previously. For the example in FIG. 12A, flow 5 queue 262 and flow 3 queue 258 are conforming, flow 2 queue 256 and flow 1 queue 254 are nonconforming, and flow 4 queue 260 and flow 0 queue 252 are empty.

As initially established and shown in FIG. 12A, the priority 0 list 264 contains flow 3 queue 258, the priority 1 list 266 is empty, the priority 2 list 268 contains flow 2 queue 256, the priority 3 list 270 contains both the flow 5 queue 262 and the flow 1 queue 254, and the nonconforming list 232 contains both the flow 2 queue 256 and flow 1 queue 254. Note that a given flow queue may migrate among different priority lists based on whether it is a conforming or nonconforming queue as determined by the conformance time of the packet at the head of the queue compared to the current system time.

Initially, the current time 274 has a value of 13 and the sequencer component is unable to transmit any packets until a send complete indication is received from the network interface. This is determined by noting that the maximum sends 276 has a value of 3 and the outstanding sends 278 has a value of 3, meaning that the maximum number of sends has been reached and any further attempts to send packets may result in an error. The use of the maximum sends 276 is to account for the internal pipeline of a network interface.

A network interface will in many instances have the ability to initially handle multiple packet sends until the internal pipeline is filled. At that point, another packet may be sent only upon completion of a previously sent packet. A send complete indication will decrement the outstanding sends 278 value before going through the processing steps of FIG. 9. Having an arrangement that uses the maximum sends 276 and the outstanding sends 278 allows the internal pipeline of the network interface to be fully utilized and provides a performance enhancement due to such efficient use.

Figure 12B:
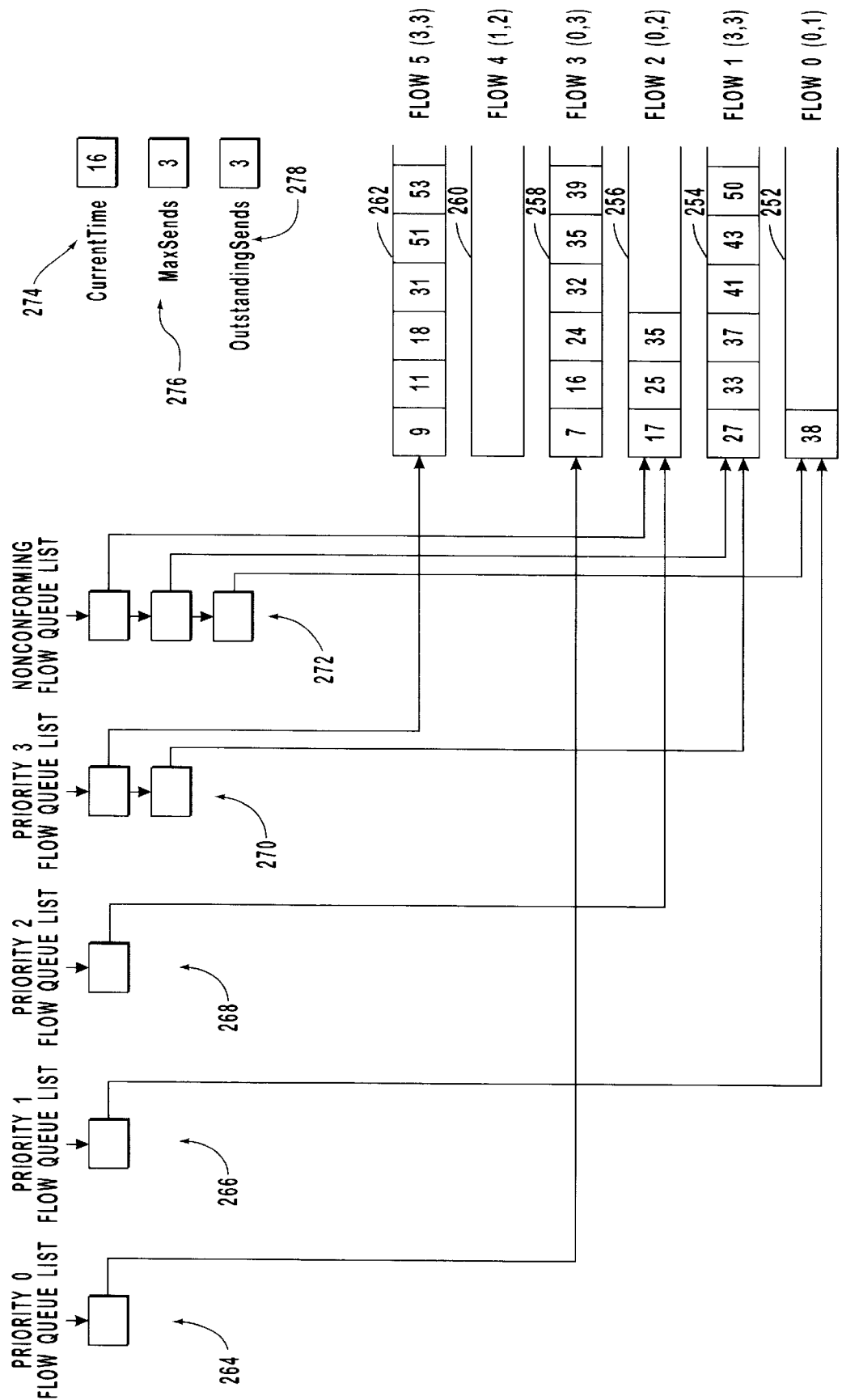

FIG. 12B shows the addition of a new packet having a conformance time of 38 into the flow 0 queue 252. This occurs when the current time 234 has a value of 16. Following the processing steps of flow chart in FIG. 8, the packet was added to the particular flow queue at step 158 (e.g, the flow 0 queue). Since the flow 0 queue 252 was empty as determined at step 160, whether or not the flow 0 queue 252 is conforming or nonconforming is determined at step 165 based on comparing the conformance time of the new packet with the current time. Since the packet was not conforming, the flow 0 queue 252 is added at step 167 to the priority 1 list 266 and the nonconforming list 272 as can be seen in FIG. 12B. Note that when dequeueing and transmitting packets at step 162 according to the processing steps shown in the flow chart of FIG. 9, no changes occurred in the data structures since no packets may be transferred at this time.

Figure 12C:
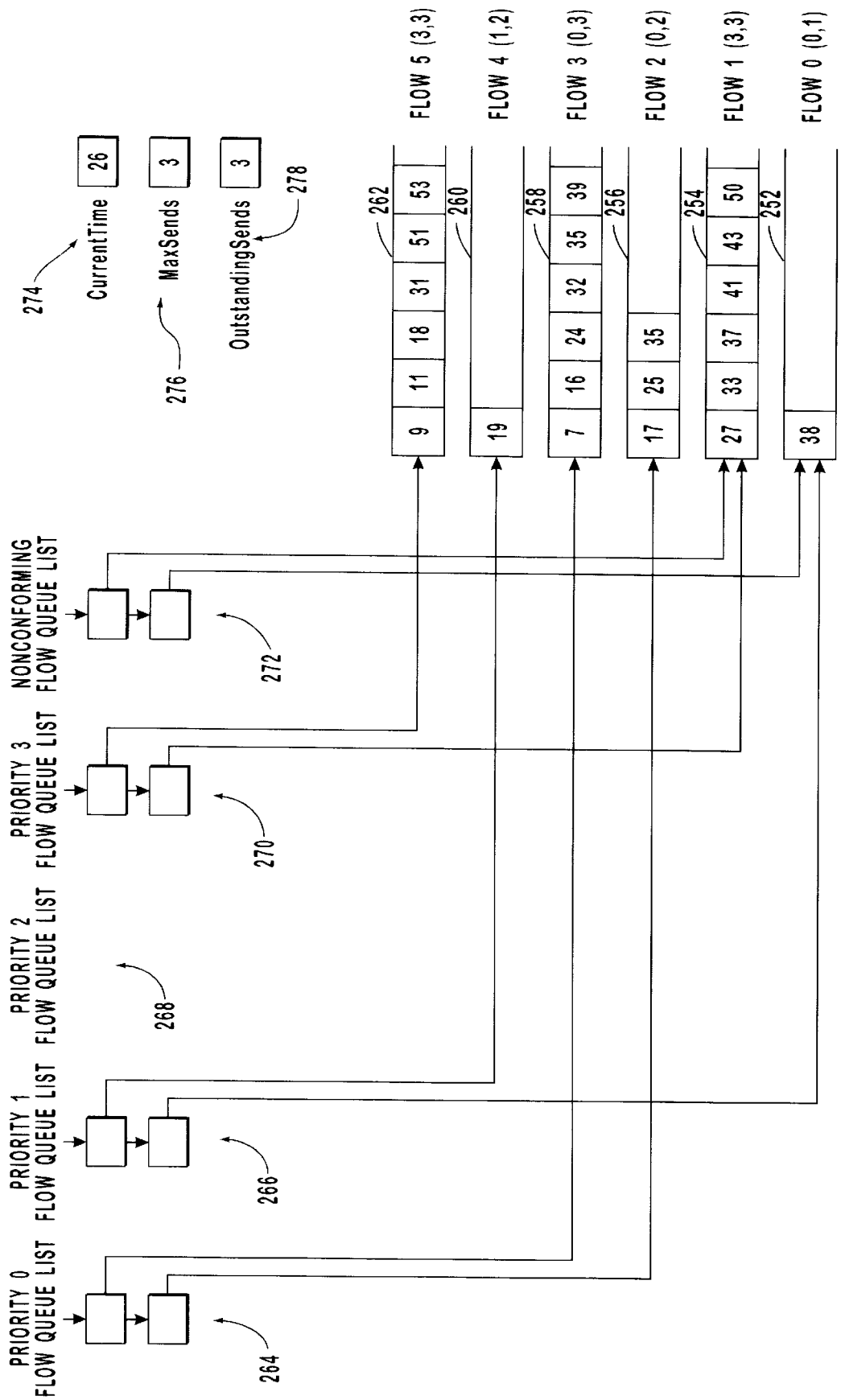

Referring now to FIG. 12C, an additional packet is received into the sequencer component for flow 4 into the flow 4 queue 260. Furthermore, the processing of the additional packet and the passage of time has caused the flow 2 queue 256 to be moved off of the nonconforming list 272, and for it to switch to a different priority list. This new packet is received when the current time 274 has a value of 26. The new packet is for flow 4, has a conformance time of 19, and is entered into the flow 4 queue 260 at step 158 (FIG. 8). Since the flow 4 queue 260 was empty as determined at step 160 and the packet is conforming as determined at step 165, the flow 4 queue 260 is considered conforming and added to the priority queue list corresponding to the conforming priority for flow 4, namely into the priority 0 list 264, at step 166. At this point, the packets are dequeued and transmitted as appropriate at step 162 following the steps shown in FIG. 9.

When processing the nonconforming list 272 from step 169 to step 176, the flow 2 queue 256 will change from nonconforming to conforming as determined at step 172. This will cause the flow 2 queue 256 to be removed from the nonconforming list 272 and the priority 2 list 268 and moved to the priority 0 list 264 at step 176. This state of affairs is shown in FIG. 12C where the priority 2 list 268 is now empty and the priority 0 list 264 contains the flow 2 queue 256. This occurs because the current time 274 has a value of 26 and has thus advanced to a point that makes the packet at the head of the flow 2 queue 256 conforming since that packet has a conformance time of 17. Again, no packets may be transmitted at this point since the maximum sends 276 value of 3 has been reached by the outstanding sends 278 value, as determined at step 178.

Referring now to FIGS. 12D through 12H, the dequeueing and transmitting of 20 packets is shown based on a series of 20 send complete indications received by the sequencer component when the current time 274 has a value of 34. Upon receipt of the first send complete that communicates that the network interface is able to accept another packet, the outstanding sends 278 value is decremented from 3 to 2. As another packet is sent, the out standing sends 278 value will be incremented to 3. As the series of 20 send complete indications are received by the sequencer component, 20 more packets to be transmitted over the network interface in the order as shown below.

Figure 12D:
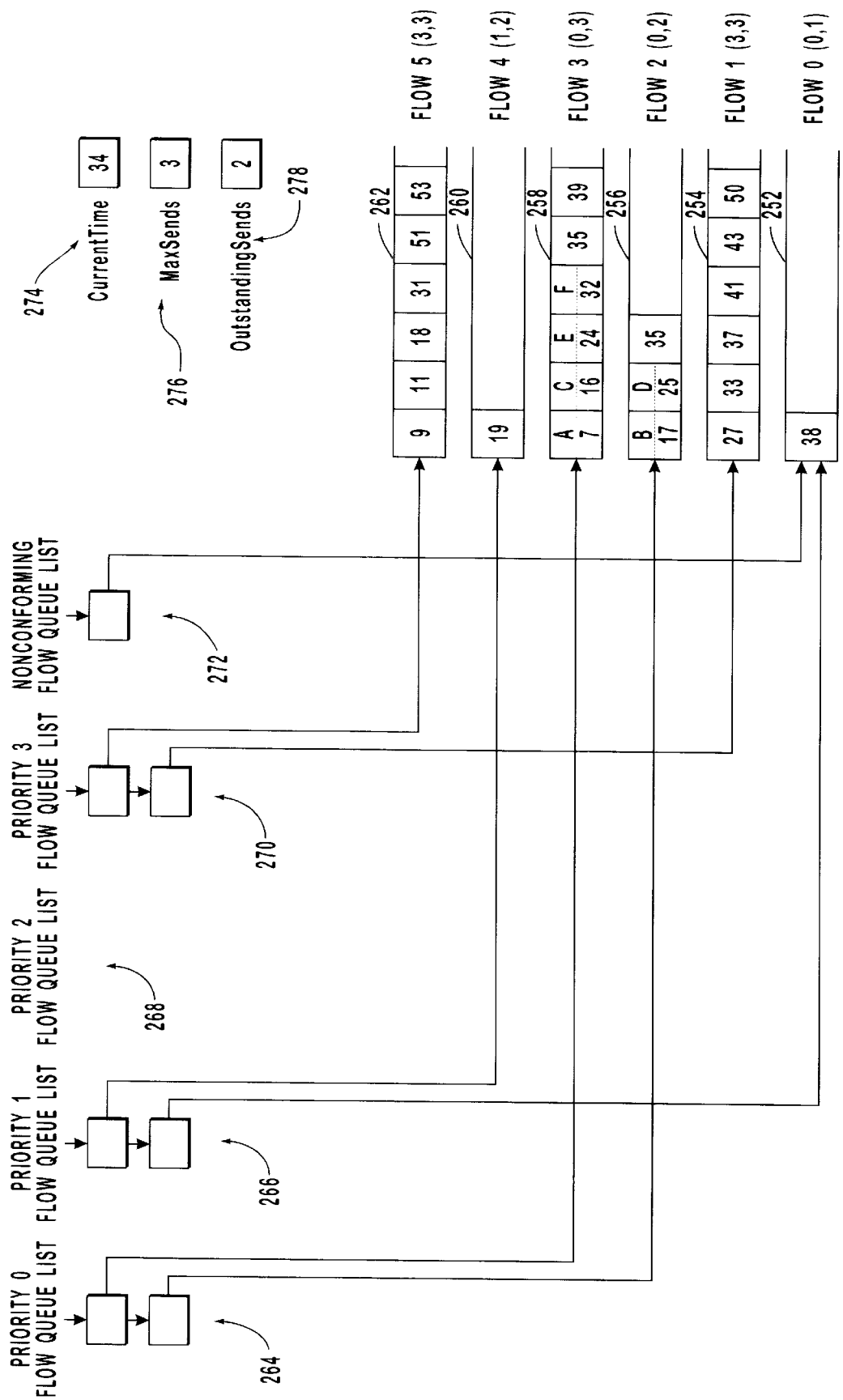

Referring now to FIG. 12D, the first six packets to be sent and the order in which they will be sent is shown by the letters A through F above the packet conformance times shown in the flow queues to clear the priority 0 list 264. The priority 0 list 264 has a round-robin queue discipline for managing and dequeueing packets from the queues contained therein. Note that prior to sending any packets, the nonconforming list 272 is processed causing the flow 1 queue 254 to be removed from the list since the head packet, having a conformance time of 27, is now conforming with respect to the current time 274 value of 34. The flow 1 queue 254 remains on the priority 3 list 270, however, since flow 1 has the same priority for both conforming and nonconforming packets.

While processing priority 0 list 264, the packets will be sent alternating between the flow 3 queue 258 and the flow 2 queue 256 until packet D having a conformance time of 25 is sent. At this point, a determination will be made at step 190 (FIG. 9) that the flow 2 queue 256 priority is to be changed to its nonconforming priority (priority 2) so that the flow 2 queue 256 is moved from the priority 0 list 264 and placed on the priority 2 list 268.

Processing will then cause packets to be transmitted from the flow 3 queue 258 until a packet is reached that is nonconforming. At that point, the flow 3 queue 258 will be moved from the priority 0 list into its nonconforming priority list, namely the priority 3 list 270. Both the flow 2 queue 256 and the flow 3 queue 258 are placed in the nonconforming list 272. This state of affairs is shown in FIG. 12E wherein the priority 0 list 264 has been completely processed and has no flow queues residing therein and the outstanding sends 278 has a value of 2 indicating that another packet may be sent.

Figure 12E:
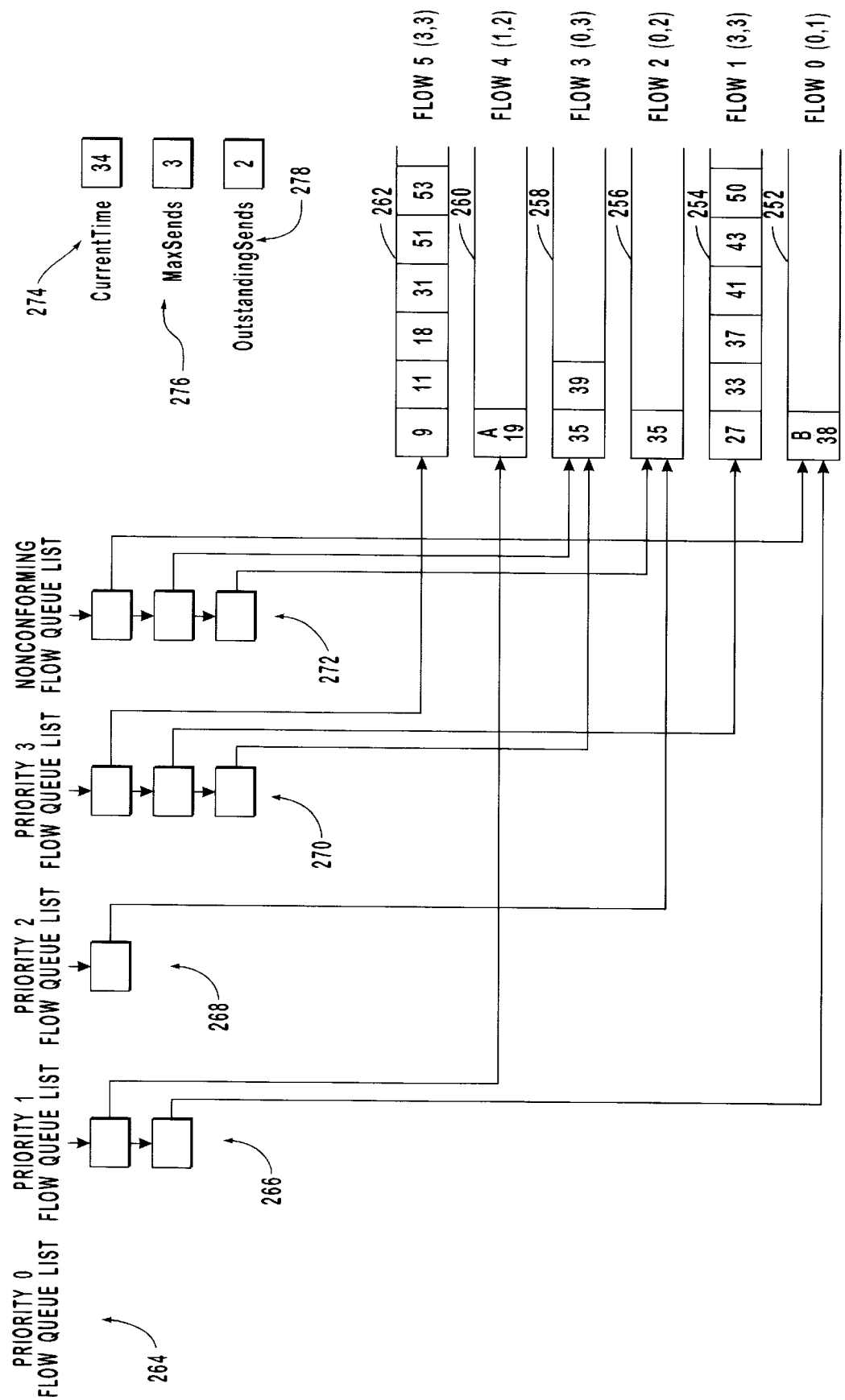

FIG. 12E shows the processing of the priority 1 list 266 that sends two packets over the network interface. Again, the queue discipline for the priority 1 list 266 is round-robin such that packets will be taken and sent in alternating fashion from the flow 4 queue 260 and the flow 0 queue 252. These two packets, labeled A and B in FIG. 12E, are all that will be sent during the priority 1 list 266 processing since the flow queues will be completely emptied.

Note that the flow 4 queue 260 is at its conforming priority while the flow 0 queue 252 is at its nonconforming priority. The net affect of priority list processing is, that in some instances, nonconforming packets are sent over the network interface before conforming packets. The ability to choose queue disciplines for the priority list processing and to choose conforming and nonconforming priorities for each flow queue allows considerable flexibility for the sequencer component user to deliver packets over the network interface according to a variety of performance criteria.

Once packet A and packet B have been sent from the state of the inter structure shown in FIG. 12E, both flow 4 queue 260 and flow 0 queue 252 will be empty. This will leave the data structures in the state shown in FIG. 12F.

Figure 12F:
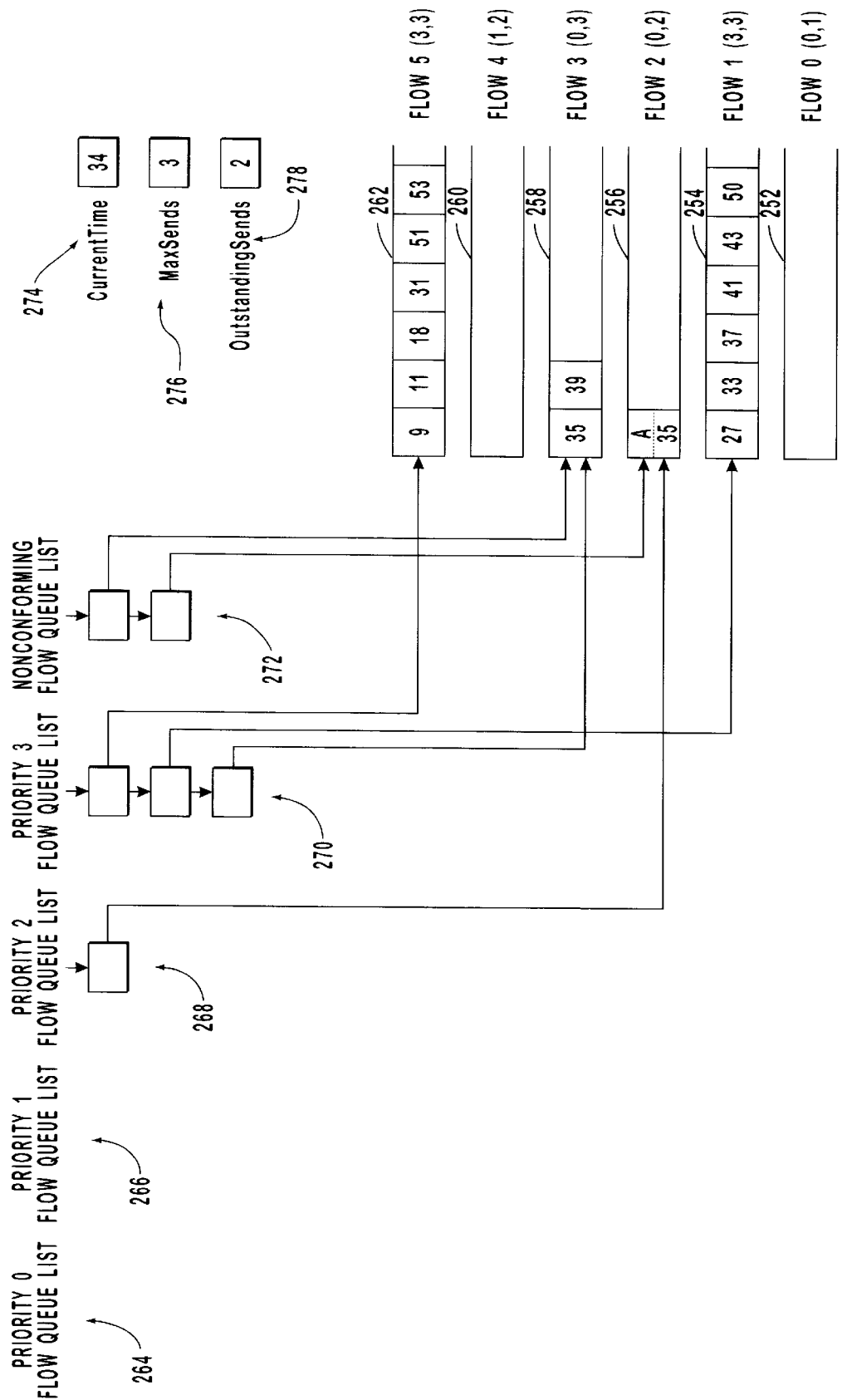

Referring now to FIG. 12F, the processing of the priority 2 list 268 is shown. This will entail the sending of one packet from the flow 2 queue 256, namely packet A with the conformance time of 35 (currently nonconforming). After transferring this packet to the network interface, the flow 2 queue 256 will be removed from the nonconforming list and the priority 2 list 268, leaving the priority 2 list 268 empty. This state of the data structures is shown in FIG. 12G.

Figure 12G:
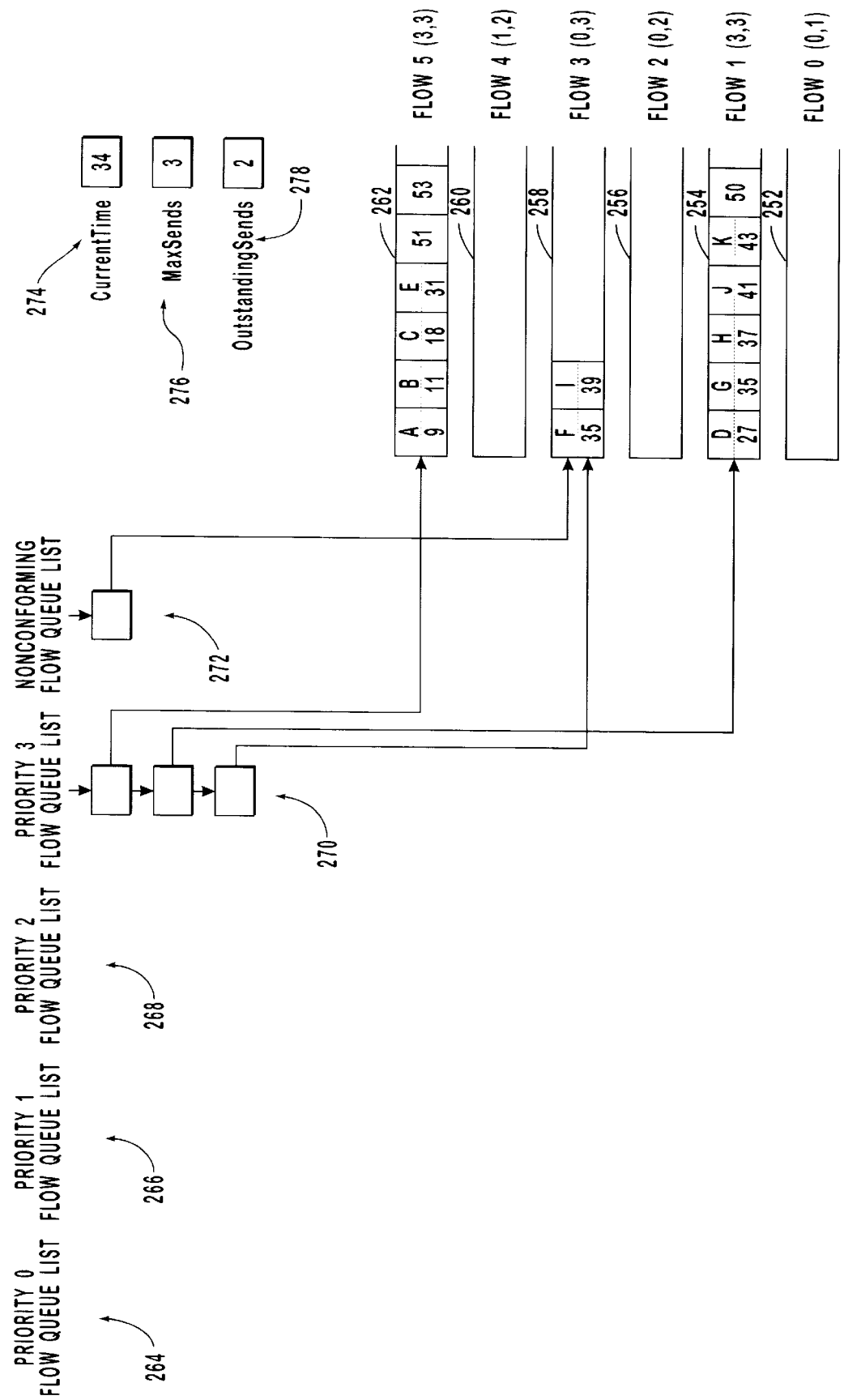
Figure 12H:
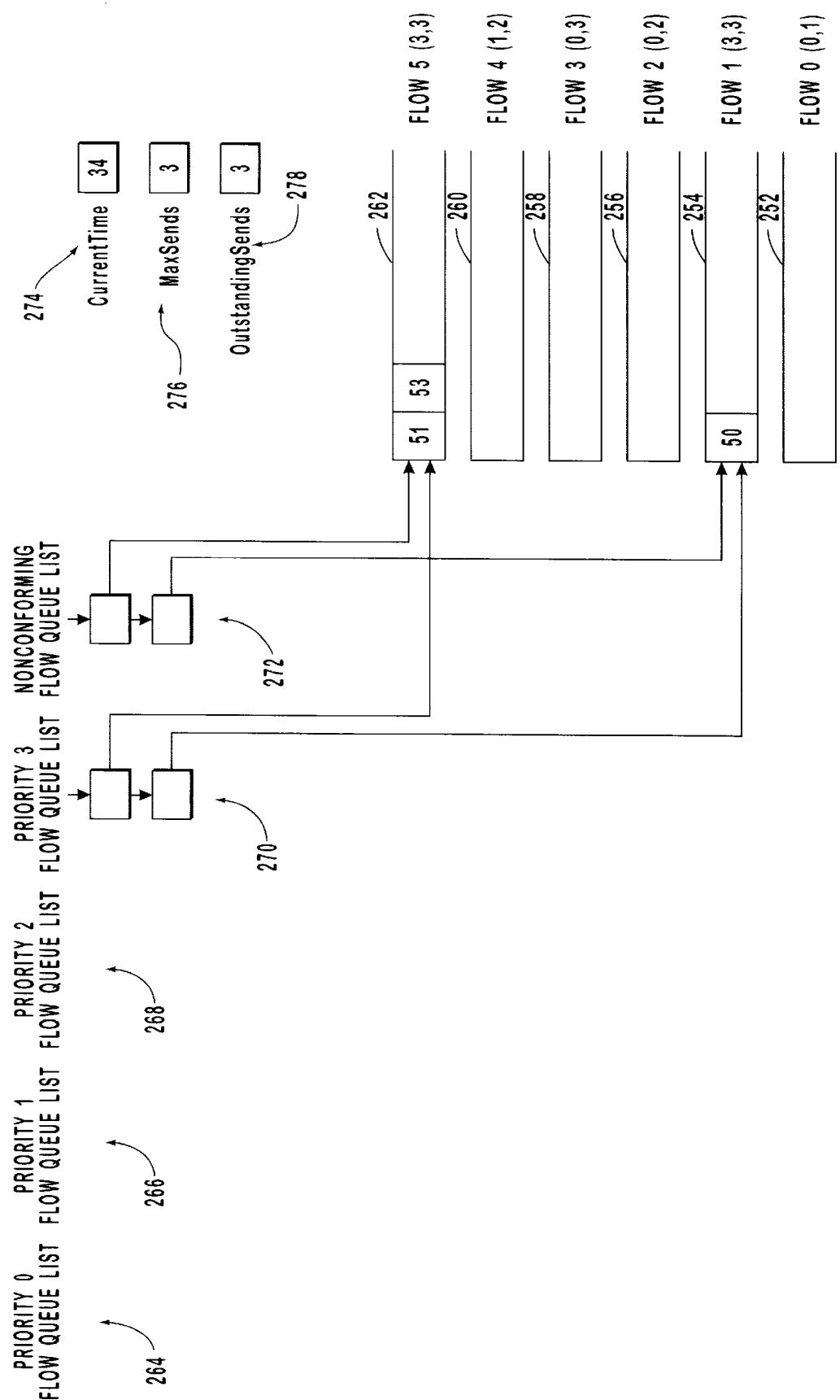

FIG. 12G shows the processing of the priority 3 list 270. The queue discipline for the priority 3 list 270 is conformance time sequential which means taking the "oldest" packet (e.g., the one having the lowest conformance time) of all the flow queues on the list such that the packets are delivered sequentially according to conformance time from the heads of each flow queue. By following this queue discipline, 11 packets will be sent, labeled A through K in alphabetical, sequential order from the respective flow 5 queue 262, flow 3 queue 258, and flow 1 queue 254. Note that with this queue discipline, all conforming packets in the flow queues on the priority 3 list 270 are delivered over the network interface before any nonconforming packets are delivered.

Following such a sequential queue discipline, packets A, B, and C are first sent from from the flow 5 queue 262, followed by packet D from the flow 1 queue 254, and then packet E from the flow 5 queue 262 is transmitted. In like manner, the transmission continues based on the conformance time of the packet at the head of each respective flow queue. The processing will continue until all 11 are sent after which no more outstanding send complete indications are received, thus ending the dequeueing and transmitting of the series of 20 packets.

When processing completes, the flow 3 queue 258 will be empty and both the flow queue 254 and the flow 5 queue 262 will exist in the nonconforming list 272. Furthermore, the outstanding sends 278 value will be at 3, the same as the maximum sends 276 value. When processing has finished, the state of the data structures will be at the state shown in FIG. 12H. At this point, another send complete will need to be received before more packets may be dequeued and transmitted. Note, also, that more packets may be received before a send complete indication is received thereby filling up the different flow queues and causing the different priority lists to be populated.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network communication system having a plurality of computer systems logically interconnected to one another and wherein data packets are communicated across the network between one or more of the computer systems, which data packets require transmission through the network in the form of packet flows that are defined as including streaming data having certain network resource requirements, such as bandwidth, that are required to meet quality of service standards for properly communicating the data packets, a method for improving flexibility of scheduling delivery of the data packets through the network by allowing different scheduling algorithms to be supported by distinct software components configured as drivers, comprising the steps for:

receiving a data packet that is scheduled for delivery by the network to one of the computer systems, said data packet being initially received by a conformer component configured as a first driver and that generates and assigns a conformance time for the data packet that signifies the earliest time at which the data packet may be sent while still conforming to the resource requirements necessary to meet quality of service standards for communicating the data packet over the network;

if necessary in order to meet a required conformance time, sending the data packet to a shaper component configured as a second driver which delays the data packet so that delivery of the data packet will occur at essentially the conformance time, thereby shaping network traffic as required by conformance time for each data packet;

if not necessary in order to meet a required conformance time, sending the data packet directly through the second driver without delay to a sequencer component configured as a third driver which has a plurality of priority queue lists, each packet flow being assigned to a priority queue list for data packets that are conforming and being assigned to a priority queue list for data packets that are not conforming with respect to the current time so that the priority queue list of a data packet can be updated when its conformance time becomes less than the current time;

assigning the data packet to the priority queue list associated with its packet flow based on whether the data packet is conforming or nonconforming with respect to the current time; and transmitting the data packet onto the communications network in order of priority of the one or more priority queue lists.

2. In a network communication system having a plurality of computer systems logically interconnected to one another and wherein data packets are communicated across the network between one or more of the computer systems which data packets require transmission through the network in the form of packet flows that are defined as including streaming data having certain network resource requirements, such as bandwidth, that are required to meet quality of service standards for properly communicating the data packets, a computer-readable medium having computer-executable program code means embodied in said medium for implementing a method for improving flexibility of scheduling delivery of the data packets through the network by. allowing different scheduling algorithms to be supported by distinct software components configured as drivers, and wherein said method is comprised of the steps for:

receiving a data packet that is scheduled for delivery by the network to one of the computer systems, said data packet being initially received by a conformer component configured as a first driver and that generates and assigns a conformance time for the data packet that signifies the earliest time at which the data packet may be sent while still conforming to the resource requirements necessary to meet quality of service standards for communicating the data packet over the network;

if necessary in order to meet a required conformance time, sending the data packet to a shaper component configured as a second driver which delays the data packet so that delivery of the data packet will occur at essentially the conformance time, thereby shaping network traffic as required by conformance time for each data packet;

if not necessary in order to meet a required conformance time, sending the data packet directly through the second driver without delay to a sequencer component configured as a third driver which has a plurality of priority queue lists, each packet flow being assigned to a priority queue list for data packets that are conforming and being assigned to a priority queue list for data packets that are not conforming with respect to the current time so that the priority queue list of a data packet can be updated when its conformance time becomes less than the current time;

assigning the data packet to the priority queue list associated with its packet flow based on whether the data packet is conforming or nonconforming with respect to the current time; and transmitting the data packet onto the communications network in order of priority of the one or more priority queue lists.

3. A method as recited in claims 1 or 2 wherein at least one of the supported scheduling algorithms is a leaky bucket conformance algorithm.

4. A method as recited in claims 1 or 2 wherein at least one of the supported scheduling algorithms is a combination token bucket algorithm and leaky bucket algorithm.

5. A method as recited in claims 1 or 2 wherein at least one of the supported scheduling algorithms is a combination token bucket algorithm and leaky bucket algorithm along with traffic parameters to calculate the conformance time according to the following steps:

generating a preliminary conformance time using the token bucket algorithm to ensure meeting the sustained data rate;

discarding the packet if is nonconforming; and generating the actual conformance time using the leaky bucket algorithm to ensure meeting the peak rate.

6. A method as recited in claims 1 or 2 wherein said transmitting step includes a step for taking a priority queue list of a higher priority and completely processing it before processing another priority queue list of a lower priority.

7. A method as recited in claim 6 wherein a round-robin queue discipline is used for taking packets from a priority queue list.

8. A method as recited in claim 6 wherein a deficit round-robin queue discipline is used for taking packets from a priority queue list.

9. A method as recited in claim 6 wherein a conformance time sequential queue discipline is used for taking packets from a priority queue list.

10. A method as recited in claim 6 wherein different queue disciplines are used for processing different priority queue lists.

11. In a network communication system having a plurality of computer systems logically interconnected to one another and wherein data Packets are communicated across the network between one or more of the computer systems, which data Packets require transmission through the network in the form of packet flows that are defined as including streaming data having certain network resource requirements, such as bandwidth, that are required to meet quality of service standards for properly communicating the data packets, a method for comprising the steps for:

receiving a data packet that is scheduled for delivery by the network to one of the computer systems;

generating at a conformer component configured as a first driver a conformance time representing the latest time the data packet should be sent in order to conform to the resource requirements necessary to meet quality or service standards for communicating the data packet over the network;

associating the conformance time with the data packet;

if necessary in order to meet a required conformance time, sending the data packet to a shaper component configured as a second driver which delays the data packet so that delivery of the data packet will occur at essentially the conformance time, thereby shaping network traffic as required by conformance time for each data packet;

if not necessary in order to meet a required conformance time, passing the data packet to a sequencer component configured as a third driver for continued processing using the conformance time, the third driver comprising a plurality of queue lists so that each packet flow is assigned to a priority queue list for data packets that are conforming with respect to the current time and is assigned to the same or a different priority queue list for data packets that are not conforming with respect to the current time;

assigning the data packet to the priority queue list associated with its packet flow based on whether the data packet is confirming or nonconforming with respect to the current time; and sending the data packet to a destination node over the communications network in order of priority of the one or more priority queue lists.

12. A method as recited in claim 11 wherein the step of generating a conformance time uses a conformance algorithm and traffic parameters associated with the packet flow.

13. A method as recited in claim 11 wherein the step of generating a conformance time uses a leaky bucket conformance algorithm and traffic parameters associated with the packet flow.

14. A method as recited in claim 11 wherein the step of generating a conformance time uses a combination token bucket algorithm and leaky bucket algorithm and traffic parameters associated with the packet flow.

15. A method as recited in claim 11 further comprising the step of discarding nonconforming packets and wherein the step of generating a conformance time uses a combination token bucket and leaky bucket conformance algorithm along with traffic parameters to calculate the conformance time according to the following steps:

generating a preliminary conformance time using the token bucket algorithm to ensure meeting the sustained data rate;

discarding the packet if is nonconforming; and generating the actual conformance time using the leaky bucket algorithm to ensure meeting the peak rate.

16. In a network communication system having a plurality of computer systems logically interconnected to one another and wherein data packets are communicated across the network between one or more of the computer systems, which data packets require transmission through the network in the form of packet flows that are defined as including streaming data having certain network resource requirements, such as bandwidth, that are required to meet quality of service standards for properly communicating the data packets, a computer-readable medium having computer-executable program code means embodied in said medium for implementing a method for improving flexibility of scheduling delivery of the data packets through the network by allowing different scheduling algorithms to be supported by distinct software components, at least one of which is configured as a driver for a sequencer component, and wherein said method is comprised of the steps for:

receiving a data packet that is scheduled for delivery by the network to one of the computer systems, said data packet including a conformance time that signifies the earliest time at which the data packet may be sent while still conforming to the resource requirements necessary to meet quality of service standards for communicating the data packet over the network;

sending the data packet directly to a driver configured as a sequencer component which has a plurality of priority queue lists, each packet flow being assigned to a priority queue list for data packets that are conforming and being assigned to a priority queue list for data packets that are not conforming with respect to the current time so that the priority queue list of a data packet can be updated when its conformance time becomes less than the current time;

assigning the data packet to the priority queue list associated with its packet flow based on whether the data packet is conforming or nonconforming with respect to the current time; and transmitting the data packet onto the communications network in order of priority of the one or more priority queue lists.

17. A computer-readable medium as recited in claim 16 wherein the priority list processing means processes each at least one priority list completely before processing another priority list and does so in priority order.

18. A computer-readable medium as recited in claim 16 wherein a round-robin queue discipline is used for processing one of the plurality of priority queue lists.

19. A computer-readable medium as recited in claim 16 wherein a deficit round-robin queue discipline is used for processing one of the plurality of priority queue lists.

20. A computer-readable medium as recited in claim 16 wherein a conformance time sequential queue discipline is used for processing one of the plurality of priority queue lists.

21. A computer-readable medium as recited in claim 16 wherein different queue disciplines are used for processing the plurality of priority queue lists.

* * * * *

UNITED STATES PATENT AND TRADEMARK OFFICE
CERTIFICATE OF CORRECTION

PATENT NO. : 6,247,061 B1
DATED : June 12, 2001
INVENTOR(S) : John R. Douceur, Yoram Bernet, Ofer Bar, Carol Ann Bell, Tsung-Yuan Charles Tai and Rajendra S. Yavatkar It is certified that error appears in the above-identified patent and that said Letters Patent is hereby corrected as shown below:

Column 6,
Line 12, after "that" and before "interact" delete "is"

Column 7,
Line 33, before "and the" change "(ROM)" to -- (ROMs) --

Column 14,
Line 27, after "queues" and before "has been" delete "is"

Column 22,
Line 54, after "the" change "out standing" to -- outstanding --

Column 24,
Line 2, after "sent" and before "from" delete "from"
Line 26, after "only as" change "illustrated" to -- illustrative --

Column 26,
Line 9, after "packet if" and before "is" insert -- it --
Line 44, after "quality" change "or" to -- of --
Line 66, after "packet is" change "confirming" to -- conforming --

Column 27,
Line 24, after "packet if" and before "is" insert -- it --

Signed and Sealed this

Twenty-fifth Day of June, 2002

*Attest:*

JAMES E. ROGAN
*Attesting Officer*     *Director of the United States Patent and Trademark Office*